(12) United States Patent
Leizerson et al.

(10) Patent No.: US 11,836,964 B2
(45) Date of Patent: Dec. 5, 2023

(54) DEVICES, SYSTEMS AND METHODS FOR SCENE IMAGE ACQUISITION

(71) Applicant: ELBIT SYSTEMS C4I AND CYBER LTD., Netanya (IL)

(72) Inventors: Ilya Leizerson, Netanya (IL); Yaron Mayerowicz, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/203,300

(22) Filed: May 30, 2023

(65) Prior Publication Data

US 2023/0306710 A1   Sep. 28, 2023

Related U.S. Application Data

(63) Continuation of application No. PCT/IB2021/061255, filed on Dec. 2, 2021.

(30) Foreign Application Priority Data

Dec. 6, 2020   (IL) .......................................... 279275

(51) Int. Cl.
*G06V 10/60* (2022.01)
*G06V 10/25* (2022.01)
(Continued)

(52) U.S. Cl.
CPC ............... *G06V 10/60* (2022.01); *G02B 5/20* (2013.01); *G02B 5/30* (2013.01); *G06V 10/25* (2022.01); *H04N 23/73* (2023.01)

(58) Field of Classification Search
CPC .......... G06V 10/60; G06V 10/25; G02B 5/20; G02B 5/30; H04N 23/73
See application file for complete search history.

(56) References Cited

U.S. PATENT DOCUMENTS

| 4,257,106 A | 3/1981 | Auer |
| 5,406,938 A | 4/1995 | Mersch et al. |

(Continued)

FOREIGN PATENT DOCUMENTS

| JP | H0534641 A | 2/1993 |
| WO | 2007143374 A2 | 12/2007 |
| WO | 2013090843 A1 | 6/2013 |

OTHER PUBLICATIONS

Israel Patent Office, Office Action for Israeli Patent Application No. 275163, dated Jun. 8, 2021, 10pp.

(Continued)

*Primary Examiner* — Santiago Garcia
(74) *Attorney, Agent, or Firm* — The Roy Gross Law Firm, LLC; Roy Gross

(57) ABSTRACT

Embodiments pertain to an imaging system configured to reduce or prevent the effect of unwanted specular reflections reflected by specular surfaces located in a scene. The system comprises at least one image acquisition device for acquiring a scene image comprising a specular surface providing specular light reflections. The at least one image acquisition device comprises at least one first image sensor and imaging optics having an optical axis for guiding light received from the scene along the optical axis onto the at least one first image sensor. The system further comprises at least one polarization filter operably positioned between the at least one first image sensor and an object. The system is configured to determine a polarization filter orientation such that an amount of specular light reflections incident onto the at least one first image sensor is reduced or eliminated.

19 Claims, 14 Drawing Sheets

(51) Int. Cl.
*H04N 23/73* (2023.01)
*G02B 5/20* (2006.01)
*G02B 5/30* (2006.01)

(56) References Cited

U.S. PATENT DOCUMENTS

| | | | |
|---|---|---|---|
| 6,028,303 A | | 2/2000 | Suzuki |
| 6,714,665 B1* | | 3/2004 | Hanna ................... G06F 18/00 |
| | | | 382/209 |
| 10,371,519 B1 | | 8/2019 | Twede et al. |
| 2001/0048782 A1* | | 12/2001 | Teng ................... G02B 6/2773 |
| | | | 385/11 |
| 2002/0125411 A1 | | 9/2002 | Christy |
| 2008/0246948 A1 | | 10/2008 | Van Schaik et al. |
| 2009/0296168 A1 | | 12/2009 | Proudfoot et al. |
| 2010/0079618 A1 | | 4/2010 | Sato et al. |
| 2010/0182420 A1* | | 7/2010 | Mitte ................... G06V 10/141 |
| | | | 348/86 |
| 2011/0050854 A1 | | 3/2011 | Kanamori et al. |
| 2011/0228115 A1* | | 9/2011 | Ben-Ezra ............ H04N 23/60 |
| | | | 348/208.7 |
| 2012/0307128 A1 | | 12/2012 | Vorovitchik |
| 2013/0088612 A1* | | 4/2013 | Imai ....................... H04N 23/75 |
| | | | 348/222.1 |
| 2015/0124148 A1 | | 5/2015 | Osoinach |
| 2016/0081547 A1* | | 3/2016 | Gramatikov ........... G01N 21/23 |
| | | | 356/369 |
| 2017/0270375 A1* | | 9/2017 | Grauer ................... H04N 23/11 |
| 2019/0244375 A1* | | 8/2019 | Choi ..................... G06T 7/0004 |
| 2019/0268521 A1 | | 8/2019 | Asano et al. |
| 2020/0341147 A1* | | 10/2020 | Dussan ................... G01S 7/487 |
| 2021/0026164 A1* | | 1/2021 | Skorka .................. H04N 25/13 |
| 2021/0124269 A1* | | 4/2021 | Dunphy ................ G01S 7/4814 |
| 2021/0356572 A1* | | 11/2021 | Kadambi ............... G01S 13/89 |

OTHER PUBLICATIONS

PCT Search Report for International application No. PCT/IB2021/061255 dated Apr. 13, 2022, 3 pp.
PCT Written Opinion for International application No. PCT/IB2021/061255 dated Apr. 13, 2022, 4 pp.

* cited by examiner

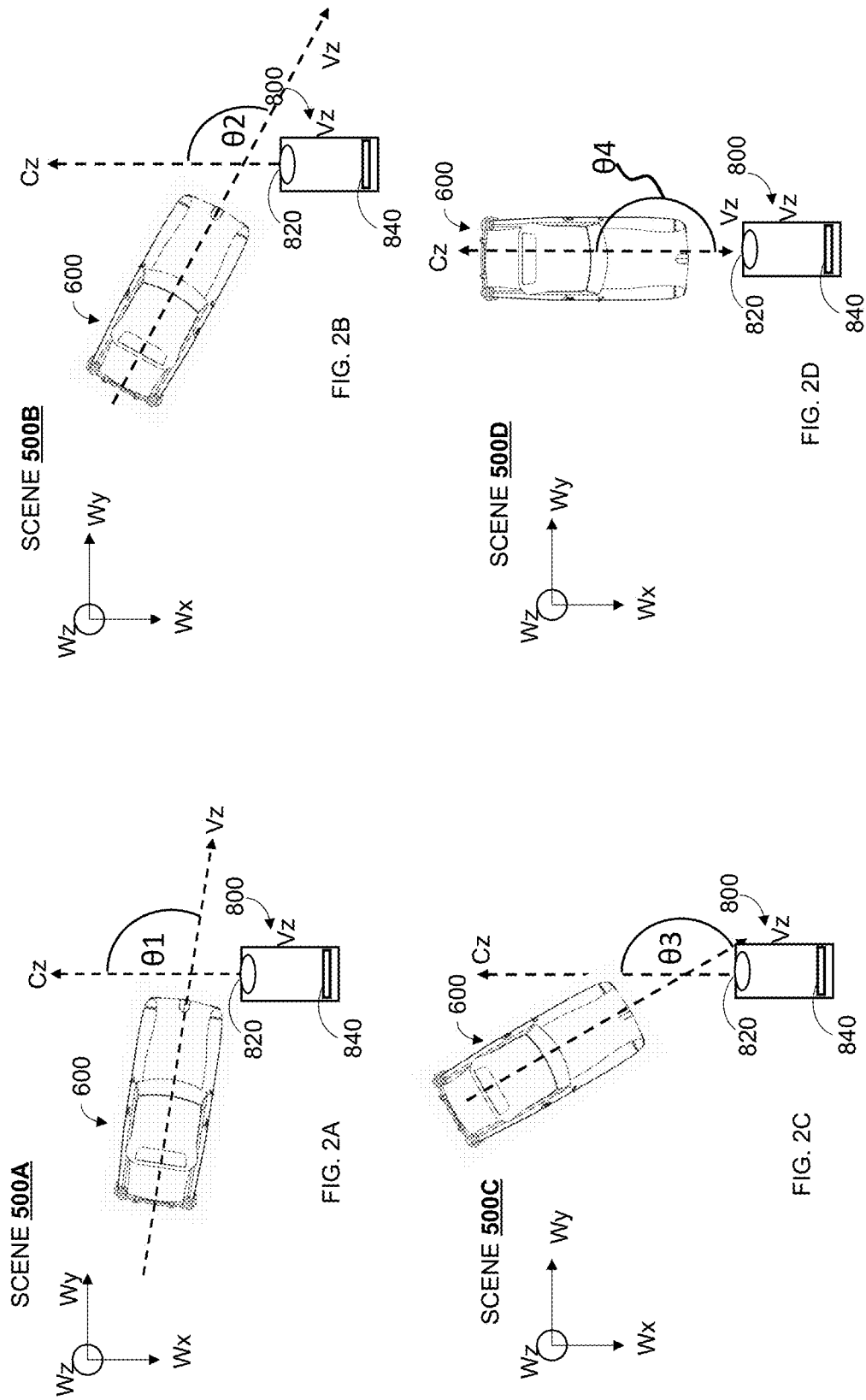

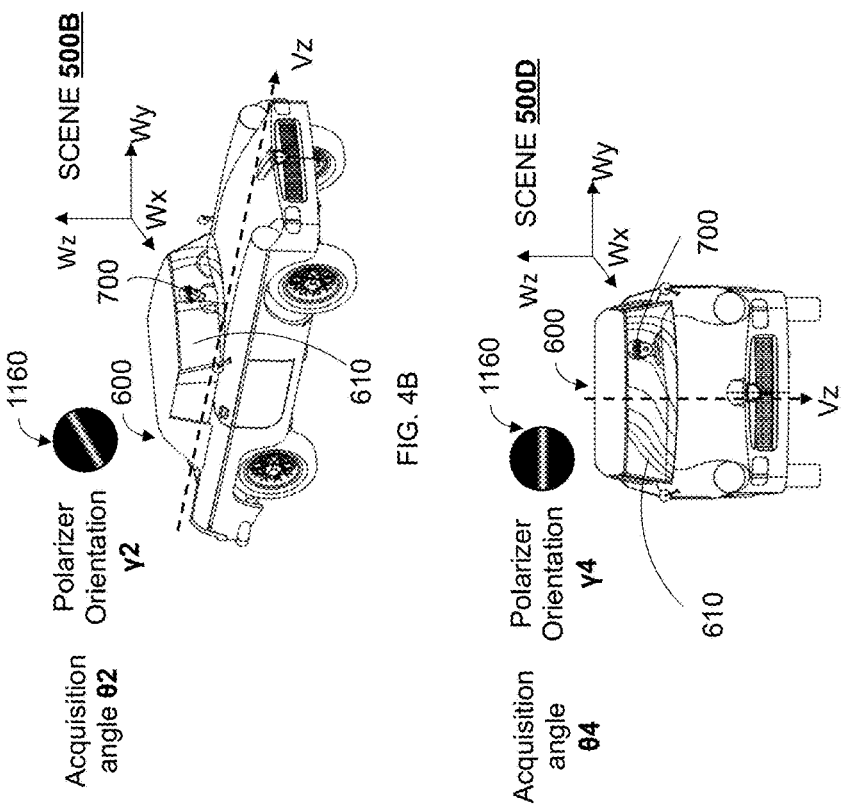
FIG. 4A
FIG. 4B
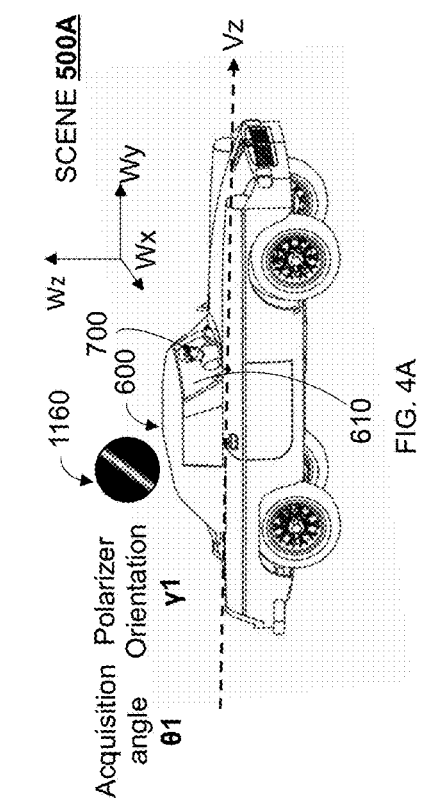
FIG. 4C
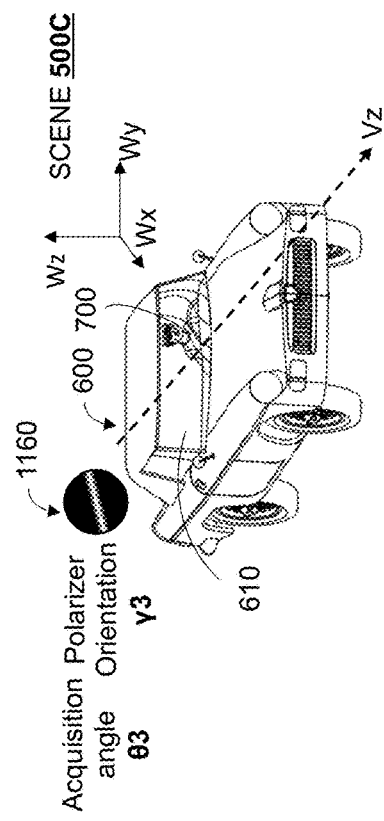
FIG. 4D

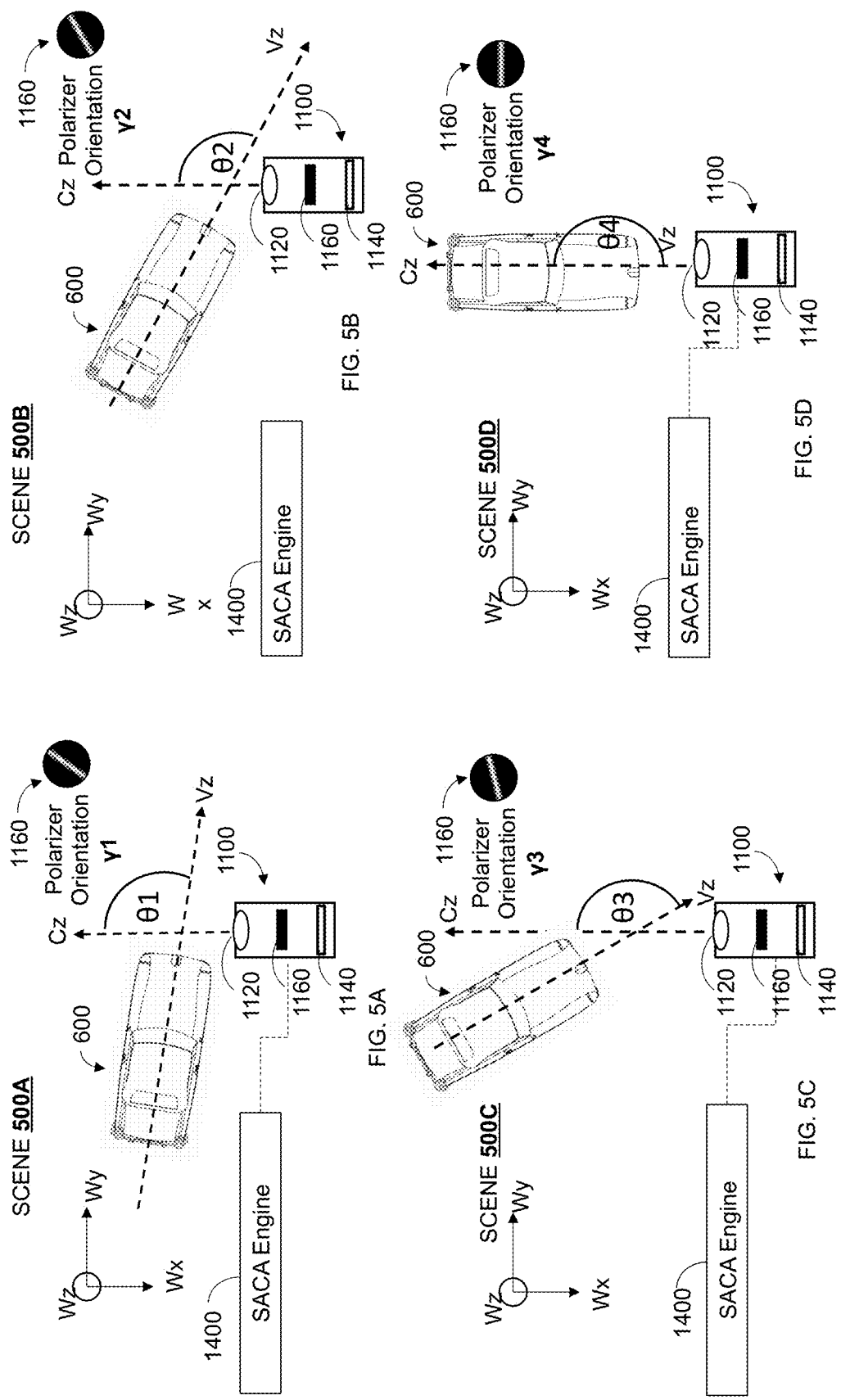

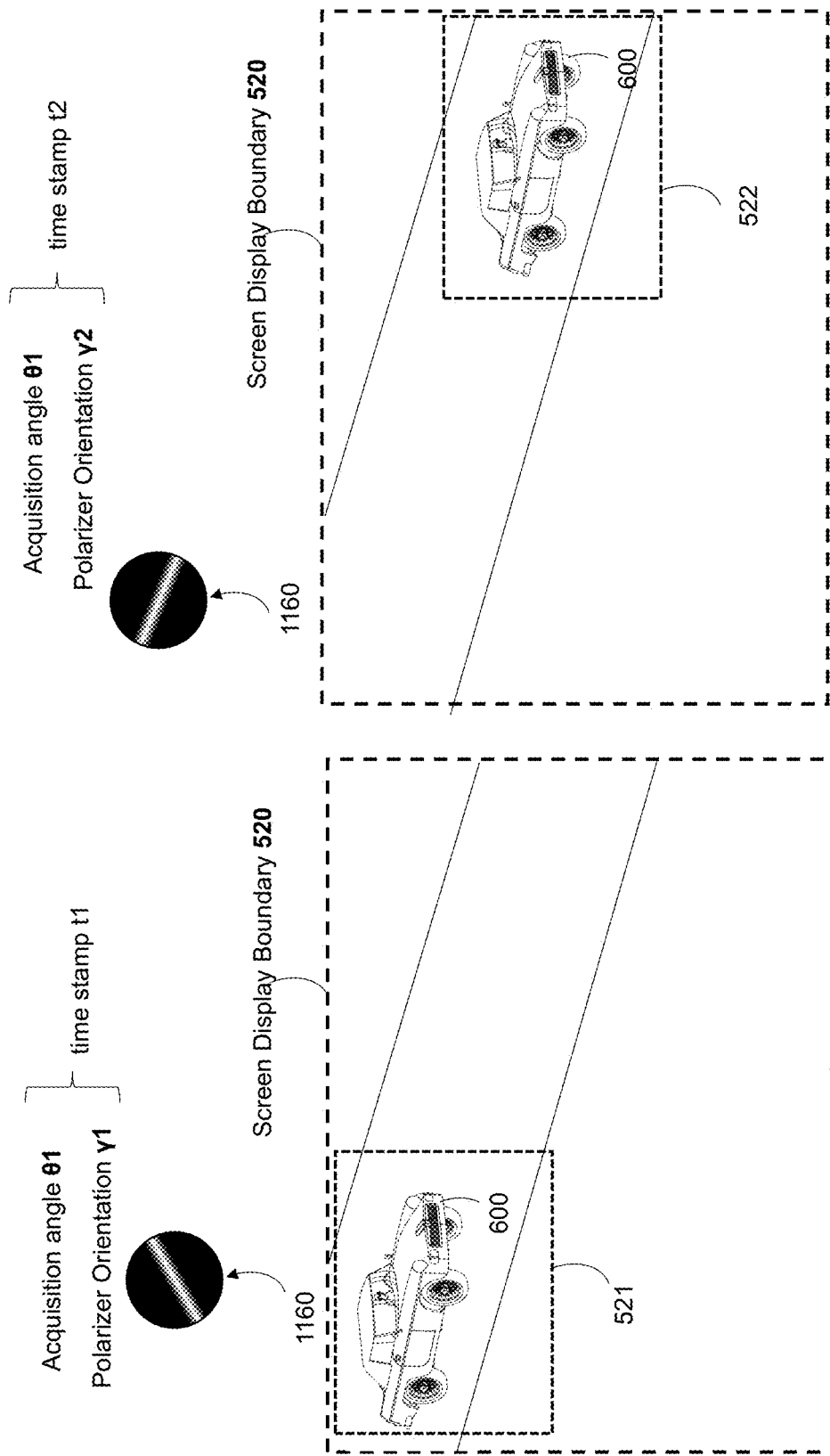

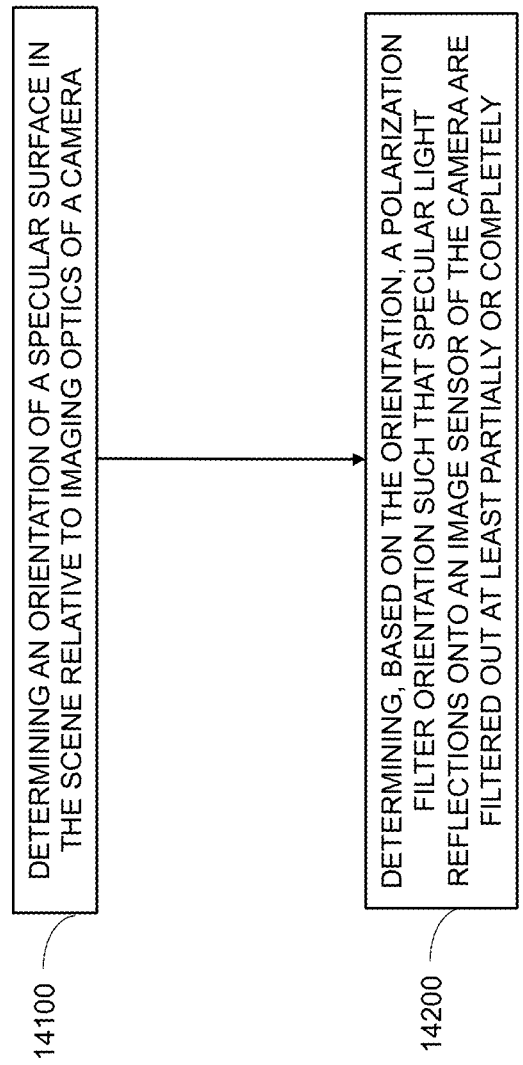

DEVICES, SYSTEMS AND METHODS FOR SCENE IMAGE ACQUISITION

CLAIM OF PRIORITY

The present application is a Bypass Continuation of PCT Patent Application No. PCT/IB2021/061255 having International filing date of Dec. 2, 2021, which claims priority to Israel Patent Application 279275, filed on Dec. 6, 2020, the contents of which are all incorporated by reference herein in their entirety.

BACKGROUND

The introduction of unwanted reflections into an image by reflective surfaces is a common problem encountered in many imaging applications. For example, when an at least partially transparent and reflective surface such as a glass window is positioned between an object to be imaged and an image acquisition device, light reflected from the surface towards the image acquisition device may render the object invisible or unrecognizable. Polarizing filters are often used to reduce or filter out unwanted specular reflections.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 2A-D schematically shows top views of the platform in the different orientations shown in FIGS. 1A-D, respectively.

FIGS. 4A-D schematically shows images of elevation views of a platform positioned at different orientations in a scene and providing specular reflections which are reduced or filtered out by the imaging system, according to some embodiments.

FIGS. 5A-D schematically shows top views of the platform positioned at the different orientations in the scene of FIGS. 4A-D along with a camera capturing images of the platform, according to some embodiments.

FIGS. 8A-B schematically shows an image of a platform in a scene, the image displaying reduced or no specular reflections, according to some embodiments.

FIG. 14 is a flowchart of a method for imaging a scene, according to some embodiments.

DETAILED DESCRIPTION

Figure 1A:
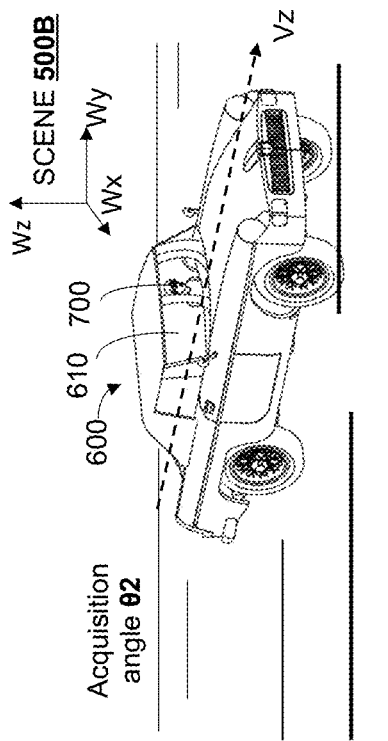
FIGS. 1A-D schematically shows images of elevation views of a platform positioned at different orientations in a scene and the specular reflections reflected from the platform.
Figure 1B:
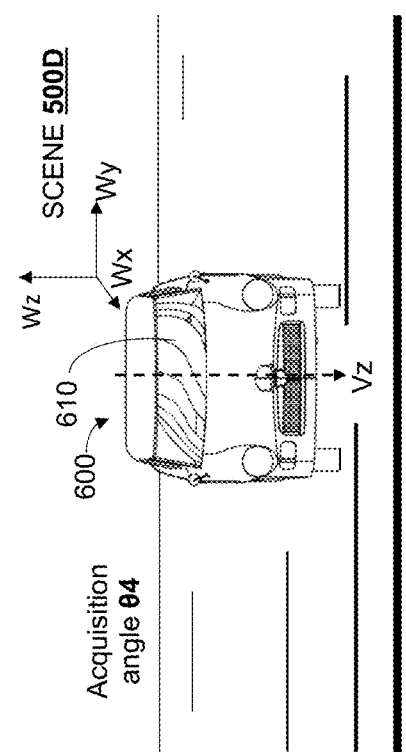
Figure 1C:
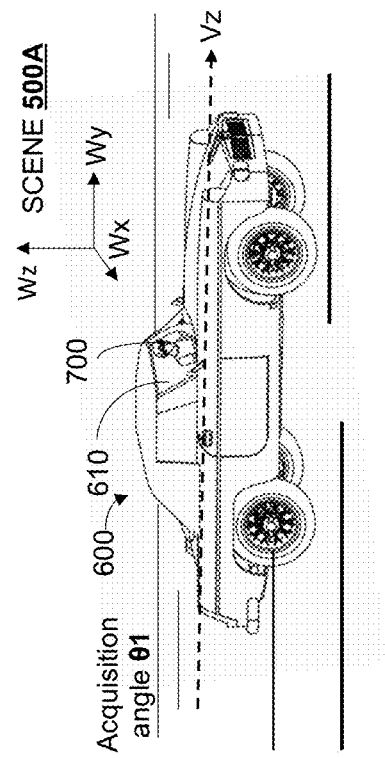
Figure 1D:
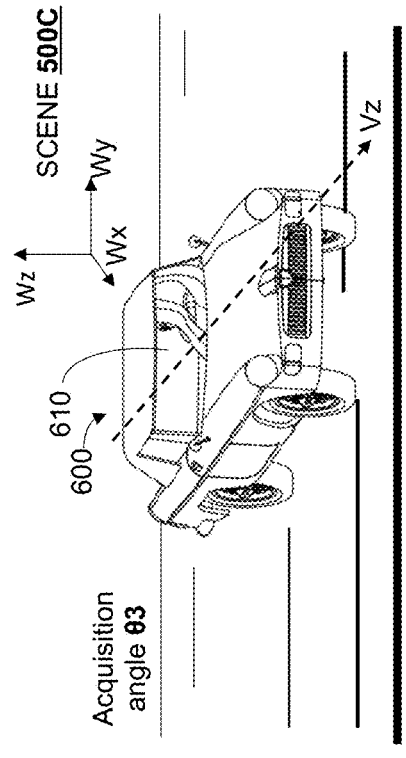

Aspects of disclosed embodiments pertain to systems, devices and/or methods configured to acquire images of a scene comprising reflective specular surfaces and which are further configured to reduce or eliminate unwanted reflections (also: glare) from the reflective specular surfaces.

Some embodiments pertain to the reduction or elimination of unwanted specular reflections for imaging a portion of the scene behind a transparent and specular surface, for example, to allow characterizing the scene portion and/or characterizing one or more objects which may be located behind the transparent and reflective specular surface. Generally, specular light reflections may originate from natural and/or artificial light sources. Depending on the scene acquisition conditions, the same surface may exhibit or may not exhibit specular characteristics.

A scene portion that is behind a specular surface that is also transparent may herein be referred to as a scene's specular region-of-interest ("specular ROI" or "sROI").

In some embodiments, the sROI may be defined by the boundaries of the transparent and specular surface (e.g., window frame, windshield frame).

In some embodiments, a transparent and specular surface may cover the entire field-of-view (FOV) of an image acquisition device.

A scene portion that does not include the area behind a transparent and specular surface may herein be referred to as ex-sROI. In some examples, ex-sROI may or may not comprise specular surfaces. For example, ex-sROI may comprise opaque and specular surfaces such as, for example, a car's motor hood.

Any "transparent surface" is herein considered to be "at least partially transparent" and includes, for example, surfaces having 50% or 60%, 70% or substantially perfect transparency.

The term "transparent" may pertain a variety of wavelengths including the visible spectrum and/or the near-infrared and/or infrared wavelength spectrum and/or other portions of the electro-magnetic spectrum.

Although embodiments disclosed herein refer to reducing or avoiding the imaging of unwanted specular reflections reflected from transparent and specular surfaces, this should by no means be construed in a limiting manner. Accordingly, the principles outlined herein with respect to the reduction or prevention of imaging specular light reflections reflected from transparent and specular surfaces are analogously applicable for the acquisition of images of opaque and specular surfaces.

In the discussion that follows, without be construed in a limiting manner, a reduction in imaged reflections may pertain mainly to specular reflections, which include linear polarization (e.g., s-polarization).

Examples of specular surfaces can include glass, water and/or metallic surfaces.

According to some embodiments, imaging a scene comprising a specular and, optionally, transparent surface which is positioned between an image acquisition device and an object can be performed without requiring polarization analysis of the light reflected from the surface for filtering filter out unwanted reflections by a polarization filter. For example, no on-site light polarization measurement may be required for reducing or filtering out specular reflections reflected from a specular surface. Accordingly, in some embodiments, devices and systems described herein are configured to reduce or prevent the imaging of unwanted reflections without user-noticeable latency or with near-zero latency, e.g., in real-time (RT) or near-RT.

Embodiments pertain to the gathering or acquiring of data descriptive of a specular sROI located behind transparent and specular surfaces and ex-sROI, for example, for monitoring, controlling, and/or intelligence gathering purposes.

Acquiring specular sROI and ex-sROI data may be followed by data analysis for characterization of the specular sROI and ex-sROI. Monitoring, controlling and/or intelligence gathering may include, for example, characterizing objects which are located in the specular sROI and the ex-sROI. Characterizing an object may include, for example, object identification and/or classification. In some examples, object characterization may be employed for identification and, optionally, authentication purposes, for example, using facial and/or other physical characteristics recognition (e.g., gait analysis) and comparison with corresponding physical characteristics of known individuals.

Aspects of devices, systems and methods described herein may thus be employed in the context of, for example, border control applications, perimeter surveillance, authentication applications for access control, remote in-vehicle or in-platform passenger recognition, counting the number of passengers in vehicles or platforms, measuring physical characteristics of passengers in vehicles (e.g., passenger height) and/or the like.

In some embodiments, an imaging system comprises one or more image acquisition devices or cameras that include imaging optics and an image sensor comprising a plurality of pixels generating signals related to the imaged scene. The imaging optic is configured to direct light received from the scene onto the image sensor.

The image acquisition device further includes an adjustable polarization filter that is positioned between at least one specular surface and the one or more image sensors for acquiring information about a scene.

For example, the adjustable polarization may be configured to enable acquiring information about the sROI which is behind the specular and transparent surface. The specular and transparent surface is thus positioned between the camera and the specular sROI.

In some embodiments, a plurality of image sensors may be employed along with a corresponding plurality of polarization filters. In some examples, the plurality of image sensors and polarizers may be employed by the same image acquisition device or by separate image acquisition devices which are employed by the scene acquisition system.

The polarization filter orientation may be adjusted and set to a desired orientation based on scene imaging parameters including, for example, an image acquisition direction relative to a platform in a scene to reduce or eliminate reflections from the specular surface. The desired polarizer orientation may remain fixed for a certain camera position and orientation.

In some examples, additional scene imaging parameters may be considered which may include, for instance, polarization of light incident onto the image sensor; environmental conditions (e.g., weather conditions, time of day, ambient light, and/or sun position) in relation to the geographic area comprising the scene being imaged and/or in which the camera is located. In some embodiments, the system may also be configured to determine, in addition to a desired polarizer orientation, a desired camera orientation in a scene such to further reduce or prevent specular reflection from reaching an image sensor.

In examples discussed herein, it may be assumed that a lateral displacement of an image acquisition device relative to a specular surface is significantly shorter than a distance between the device and the specular surface, such that a change in acquisition direction due to lateral displacement between the image acquisition device and the specular surface can be considered negligible. However, in cases where such lateral shift is not significantly shorter than a distance between the image acquisition device and the specular surface, the lateral shift is considered to determine a corresponding change in the image acquisition direction. For example, a lateral displacement (up/down and/or sideways) between the image acquisition device and the specular surface exceeding (increasing or decreasing) a high viewpoint angle threshold may be taken into consideration by the system for updating an initial polarizer orientation to obtain an updated desired polarizer orientation. Correspondingly, in cases where a lateral displacement between the image acquisition device and the specular surface does not exceed the high viewpoint angle threshold, then such lateral displacement is not considered by the system as an input parameter value for determining an updated desired polarizer orientation. In some examples, the upper viewpoint angle threshold may be 5 degrees.

Based on the orientation between a camera's imaging optics and the specular surface, a characteristic (e.g., orientation) of the polarization filter is configured such that, for example, the sROI behind a specular and transparent surface becomes sufficiently visible to allow sROI characterization. In some examples, specular sROI characterization may include, for example, characterization of objects located behind the specular and transparent surface for instance, for the purposes of object identification, classification and/or authentication. Analogously, in some embodiments, the polarizer may be configured to allow object characterization comprised in ex-sROI. In some embodiments, the system may be operable to automatically switch between different polarizer configurations when imaging the sROI and ex-sROI of the scene in manner to reduce or prevent the effect on imaging of unwanted specular reflections from either one of the sROI and ex-sROI.

A specular sROI may be considered "sufficiently visible" if objects in the specular sROI are identifiable, for example, by the naked human eye and/or (e.g., automatically or semi-automatically) by an electronic analysis system, and/or the like. The electronic analysis system may for instance be operable to characterize image data descriptive of the specular sROI. In some embodiments, an image comprising the specular sROI behind the specular and transparent surface may be displayed to a user of the system. In some embodiments, an output relating to characteristics of the specular sROI may be output by the system. The output may include, for example, visual information, auditory information and/or tactile information. In some examples, information for characterizing the specular sROI may be provided in a non-visual manner.

In some examples, a specular surface (which may comprise opaque surface portions and transparent surface portions) may be part of a stationary and/or movable (e.g., mobile) platform. A specular and transparent surface of a platform may include, for example, a vehicle window such as the window of a passenger car; truck; bus; the window of a rail-based transport vehicle including trains, subways, trams, etc.; a cockpit window; an aircraft window; the window of a building such as the window of a residential building, an office building window, a shopping window; a glass door; a sentry box window; and/or the like. A specular and opaque surface may include metallic platform surfaces.

As mentioned above, a characteristic (e.g., orientation) of the polarization filter may be configured (e.g., controlled) based on an orientation of the specular surface relative to the image sensor. For instance, an imaging system may be configured to automatically analyze an orientation of a specular surface relative to the image sensor to determine a desired polarization filter orientation. At the desired polarization filter orientation, the amount of specular reflections incident onto the image sensor(s) may be reduced or prevented. The polarization filter may be set to the desired orientation in a manual, automatic or semi-automatic manner.

It is noted that the terms "determining" and "deriving a relative orientation", as well as grammatical variations thereof, may herein also encompass the meaning of the term "estimating a relative orientation".

In some examples, controlling a polarization filter orientation may be based mainly or solely on the specular surface orientation relative to the image sensor.

In some embodiments, the orientation of a specular surface in a scene relative to a (e.g., world) reference frame and/or relative to a camera's imaging direction (also: camera-surface orientation) may be predictable and/or constant or substantially constant over a comparatively long period of time. Therefore, slight variations in orientation of a specular surface relative to the world reference frame and/or to the imaging direction may be considered negligible as long as or if these variations allow, for a desired polarization filter orientation, generating images of the scene behind the specular and transparent surface, for example, to enable specular sROI and ex-sROI characterization including, for instance object characterization. Hence, in some examples, for a certain camera position in the world reference frame and imaging direction, camera-surface orientation values may be associated with (also: mapped to) corresponding desired polarizer orientation values. The camera-surface orientations values may be associated with the corresponding range of desired polarizer orientation values through a look-up-table and/or through a mathematical function. In some examples, polarizer orientations may be predetermined with respect to predicted camera-surface orientation estimations.

In some embodiments, the orientation of a specular surface relative to a (e.g., world) reference frame and/or relative to an image sensor located may be predictable and/or constant or substantially constant over a comparatively long period of time, considering natural and/or manmade physical characteristics of a geographical area in which the specular surface and image sensor are located.

Manmade physical characteristics may pertain, for example, the position, orientation and/or configuration of buildings (e.g., window position, orientation and/or height above ground), artificial lighting configuration (e.g., streetlights), infrastructure including roadways and venues accessed by the roadways, parking lots, and/or the like.

Natural physical characteristics may pertain, for example, to terrain topography, vegetation, geological characteristics, and/or the like, in a geographic area.

The orientation of a specular surface within a scene may depend on such manmade and/or natural characteristics of the scene. In some further examples, an expected or instantaneous orientation of a specular surface in a scene may depend on manmade and/or natural characteristics, and an (e.g., expected or instantaneous) orientation of a specular surface relative to a selected imaging direction may depend on manmade and/or natural scene characteristics. Therefore, an (e.g., expected or instantaneous) orientation of a specular surface may be determined (e.g., estimated) based on manmade and/or natural scene characteristics. Hence, a polarization filter orientation may be configured based on knowledge of manmade and/or natural scene characteristics and further based on a selected imaging direction (pitch, yaw) of the acquisition device within the scene.

It is noted that although examples described herein pertain mainly to the imaging of outdoor scenes, these should not be construed in a limiting manner and that the same concepts may also be applied in indoor scene imaging applications. Such indoor scene imaging applications may include, for example, imaging a scene in a parking garage, underground and/or above ground mass transportation facilities (e.g., subway stations, train stations, airport terminals, and/or the like.

In some embodiments, a platform or specular surface in a scene may be considered to have a basic orientation with respect to yaw and/or pitch relative to the scene's reference coordinates. The basic orientation may pertain to a nominal orientation as well as to deviations from the nominal orientation within a maximum deviation range. An initial desired polarizer configuration may be configured with respect to such nominal platform orientation.

As long as the platform orientations deviates within the maximum range, the deviation may be considered negligible and therefore not used as an input parameter for updating the desired polarizer orientation. However, if the deviation exceeds the maximum range then the initial desired polarizer orientation is updated to obtain a new (also: updated) polarizer orientation.

In some embodiments, the system may be configured to determine a platform's orientation and update the polarizer configuration when the deviation exceeds the maximum deviation range. The system may be configured to perform these steps in real-time or substantially in real-time. In some examples, a maximum deviation range may be defined by +/−5 degrees from the nominal platform orientation.

In one example, the position and orientation of a closed office building window with respect to a world reference frame may remain constant. In a further example, with respect to the world reference frame, the orientation of platforms expected to traverse along a certain route may be predictable for any platform position along that route. In a yet further example, considering a parking space position and orientation with respect to the world reference frame, one of two possible orientations of a vehicle to be parked in that parking space is predictable.

Orientations of vehicles traveling along a road or parking in a basic orientation may slightly vary among different vehicles. However, as mentioned above such variations may in some embodiments be considered negligible with respect to an image sensor positioned relative to the vehicle(s) for capturing or acquiring sufficient quality images of persons located in the vehicle(s) for identification purposes. Therefore, a polarization filter may be set to an angular orientation allowing filtering out specular reflections for the purpose of identifying persons located in a vehicle, without requiring readjustment of the polarization filter due to the above noted slight variations.

In some further embodiments, considering the characteristics of the geographical area, the relative specular surface and image sensor orientations may be predictable, yet change significantly within a comparatively short period of time. However, based on these predictable changes, polarization filter orientations can be controlled comparatively fast. For example, a polarization filter orientation can be adjusted (e.g., solely) based on a known route expected to be or being traversed by a vehicle and further based on the sensor's vehicle acquisition angle for each instant vehicle position along the said route.

Hence, based on the knowledge of future or instant platform orientations in a geographical area, the orientation of the platform's transparent and specular surface relative to an image sensor's FOV capturing the platform may be predictable or derivable.

In some embodiments, a sensor's scene imaging direction may be constant. In that case, a selected polarization filter orientation may remain constant in accordance with a present or expected specular surface orientation in the sensor's FOV. For example, a polarization filter orientation may be configured for a selected specular surface orientation relative to an image sensor. The polarization filter configuration may be retained for any specular surface subsequently entering the image sensor's frame while effectively reducing or preventing the effect of specular reflections. In one embodiment, the imaging system may be configured to acquire images of a plurality of vehicles entering one after the other the image sensor's FOV. For instance, the position and imaging direction of the image sensor may be stationary in the geographic area and the polarization filter configuration may be set to a correspondingly constant value to perform image acquisition of vehicles driving on a road to obtain images of sufficient quality of persons located in the vehicles "passing by" the sensor's FOV.

In some embodiments, an imaging system may be configured to detect a (moving) platform, lock onto the platform and track it as an object of interest (OOI). Platform tracking may be implemented by a plurality of cameras that are positioned in different imaging directions and/or by at least one camera that is coupled with an (e.g., gymbaled) steering mechanism for controllably steering the camera, for example, in three degrees of freedom. The polarization filter configurations may be preset or predetermined for the various imaging directions of the at least one steerable camera and/or the plurality of cameras.

In some embodiments, the imaging system may be configured to determine platform (e.g., vehicle) characteristics. These platform characteristics may be considered for determining the orientation of a vehicle's specular surfaces, e.g., relative to the reference frame and/or the camera's imaging optics, for example, by comparing acquired platform characteristics with known platform characteristics, for instance, by using one or more known platform databases.

Platform characteristics may include a type of vehicle (e.g., passenger car, truck, bus); vehicle category (e.g., sportscar, SUV, family car) vehicle make (e.g., Mazda, Volkswagen, Porsche) and/or year of manufacturing. For example, the windshield orientation of a sportscar (e.g., Porsche 911) may differ from the windshield orientation of a Sports Utility Vehicle (SUV) such as that of a Range Rover. In some examples, a range of camera-vehicle orientation values which were determined, e.g., based on vehicle characteristics, may be associated with or mapped to a respective range of desired polarizer values, for example, through a look-up-table and/or a mathematical function.

In some embodiments, polarizer configurations may set based on where an image of a platform is shown on the screen of a display device. For example, a first polarization filter configuration may be selected when a platform's image is displayed on an upper left screen region, and a second polarization filter configuration, different from the first one, may be selected when a platform's image is displayed on an upper left screen region. Accordingly, in some embodiments, different screen display regions may be associated with different polarizer configurations. The different screen display regions may be partially overlapping.

In some examples, reflected light characteristics such as polarization may be disregarded when configuration the polarization filter. In some further examples, environmental conditions such as time of day or weather conditions may be disregarded for determining the polarization filter orientation.

Referring now to FIGS. 1A-C and FIGS. 2A-D, various scene images 500A-D are shown in which images of a vehicle 600 having a vehicle longitudinal axis Vz is acquired from different imaging directions by a camera 800 having a camera optical axis Cz and comprising acquisition optics 820 and an image sensor 840 aligned with optical axis Cz.

In the examples shown in FIGS. 1A-C and 2A-D, the imaging direction of camera 800 with respect to a scene's world reference coordinate system (Wxyz) remains stationary while the vehicle's orientation (e.g., pitch and yaw) in the world reference coordinate system (Wxyz) changes relative to the camera's imaging direction. In other examples, vehicle 600 can be stationary relative to the world reference coordinate system while the camera's orientation (e.g., pitch and yaw) relative to vehicle 600 changes. In further examples the orientation of both vehicle 600 and camera 800 may change in the world reference frame. Any of these examples and analogous scenarios are herein collectively referred to as imaging a scene comprising a specular surface from different directions by changing a relative orientation between the specular surface and a camera's imaging direction of the specular surface.

As schematically shown in FIGS. 1A-D, vehicle 600 comprises transparent and specular surfaces 610 (e.g., vehicle windshield) which introduce specular reflections into the camera's FOV. Depending on the orientation of specular surface 610 relative to camera 800, specular reflections increasingly obscure or hide visibility of the scene portion behind specular and transparent surface 610 and, therefore, of an object 700 (exemplified herein as a driver of the vehicle) positioned behind specular and transparent surface 610. For instance, at orientation θ1 shown in FIGS. 1A and 2A almost no specular reflections are introduced into the FOV of camera 800 such that image data can be generated descriptive of object 700, which is, therefore, characterizable. However, at orientation θ4 shown in FIGS. 1D and 2D, specular reflections are introduced which render object 700 nearly to entirely invisible.

As noted above, to overcome the problem of introducing unwanted specular reflections into a camera's FOV, the orientation of imaging optics of a camera relative to a specular surface may be determined. Based on the determined surface-imaging optics orientation, the angle or orientation of a polarization filter may be configured to reduce or eliminate the imaging of unwanted specular reflections by an image sensor.

Figure 3:
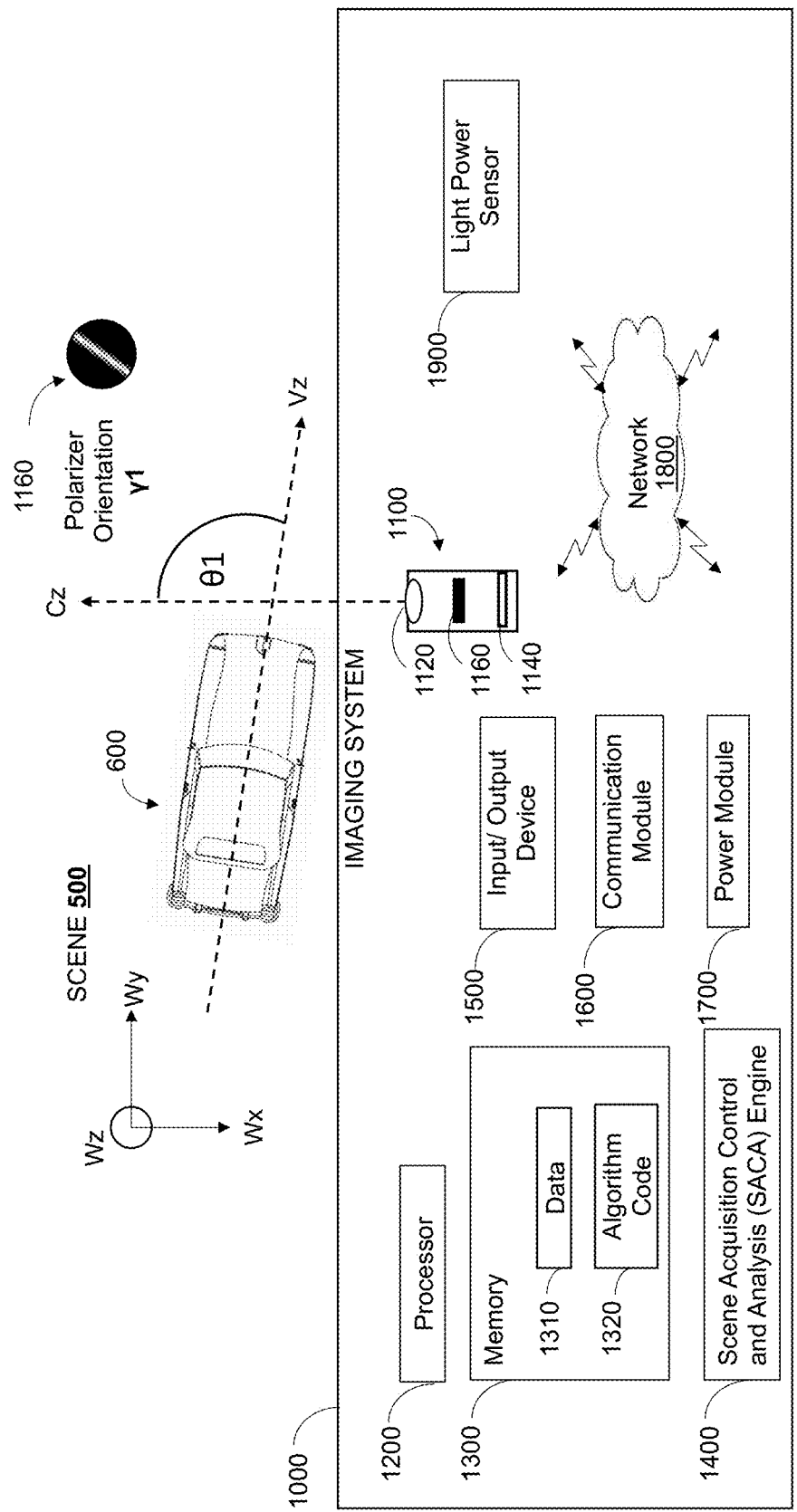
FIG. 3 is a schematic diagram of an imaging system for imaging a platform located in a scene, according to some embodiments.
Figure 6A:
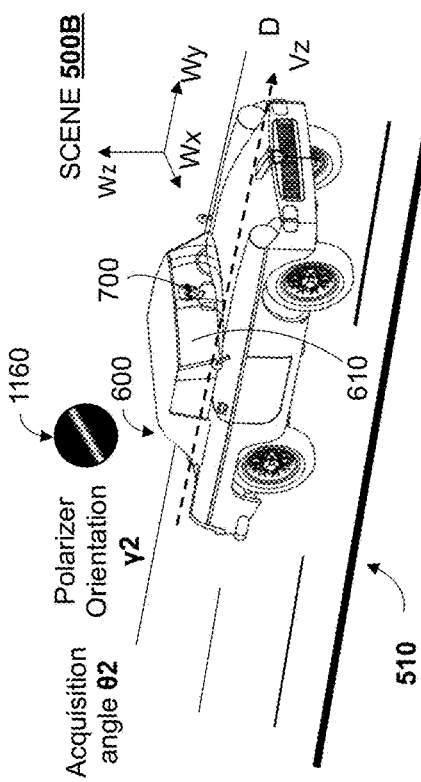
FIGS. 6A-D schematically shows images of elevation views of a platform positioned at a given orientation in a scene and providing specular reflections which are reduced or filtered out by the imaging system capturing images of the platform from different imaging directions, according to some embodiments.
Figure 6B:
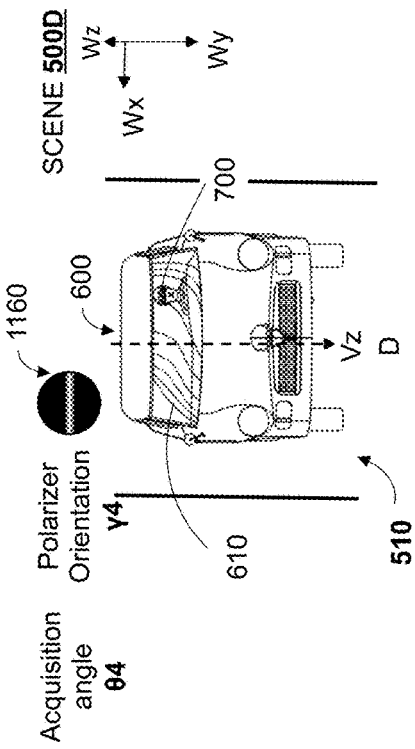
Figure 6C:
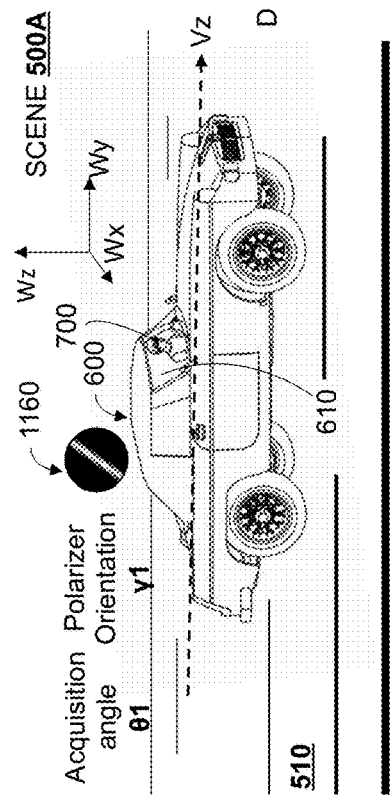
Figure 6D:
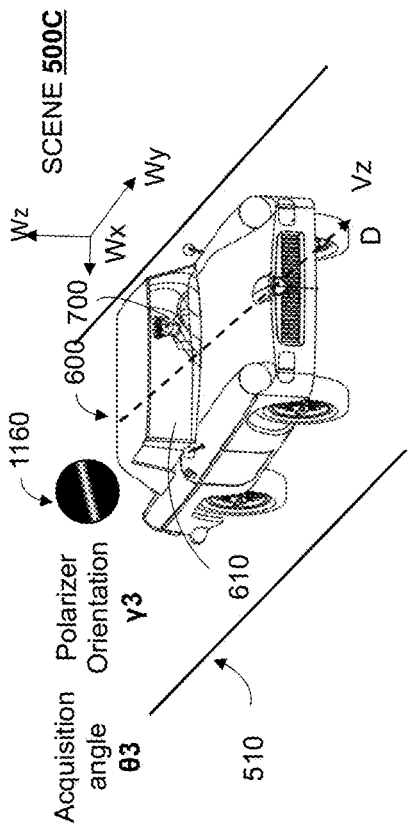
Figure 7A:
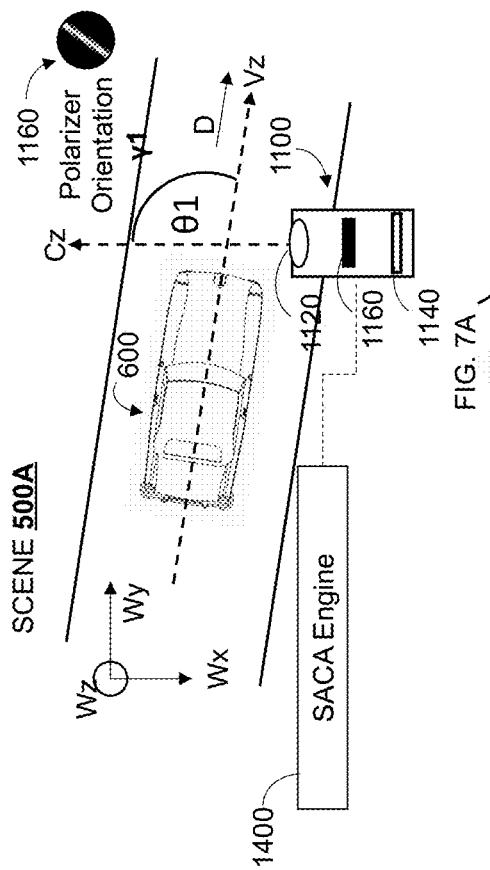
FIGS. 7A-D schematically shows top views of the platform positioned at the given orientation in the scene shown in FIGS. 6A-D, respectively, and a camera capturing images of the platform from different directions, according to some embodiments.
Figure 7B:
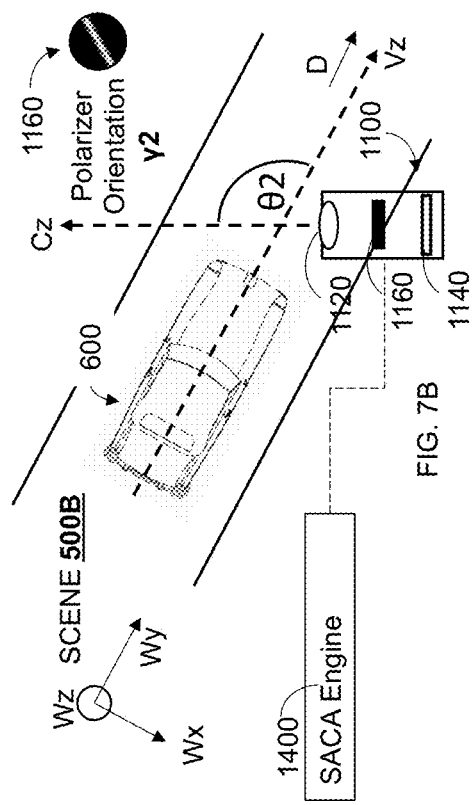
Figure 7C:
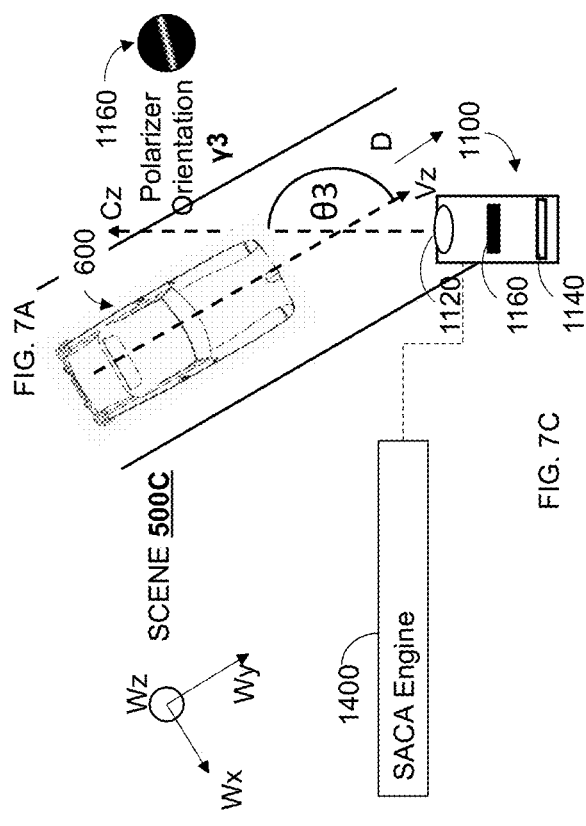
Figure 7D:
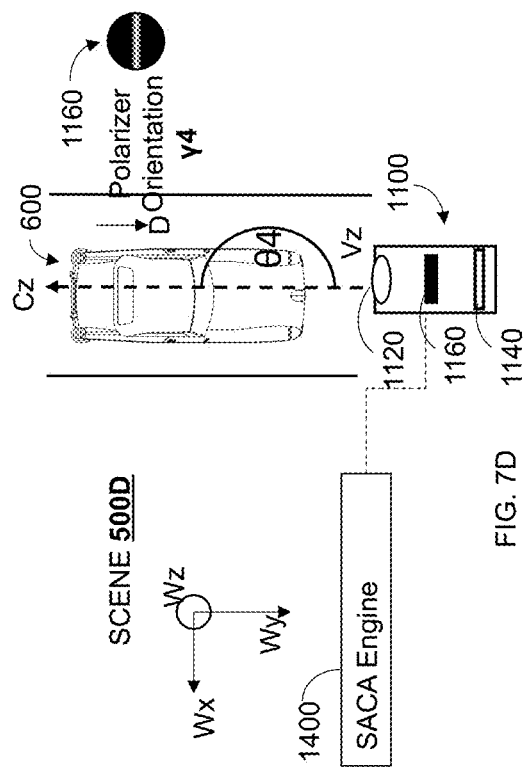

Referring now to FIG. 3, an imaging system 1000 is described which is configured to reduce or eliminate the effect of unwanted specular reflections.

Imaging system 1000 comprises a camera 1100 that includes imaging optics 1120 configured to receive and optically guide light received from scene 500 onto an image sensor 1140 of camera 1100 to generate image data descriptive of the scene. Camera 1100 further includes a polarizer or polarization filter 1160 which can be set into a desired orientation such to reduce or eliminate specular reflections received from scene 500.

At least one camera 1100 may include one or more cameras for imaging in the visible or infrared spectrum, an array of video cameras, e.g., arranged for acquiring 360 degrees video images from the scene or multiple video cameras scattered in scene 500. The one or more video cameras may be configurable such that parameters thereof such as zooming, illumination, orientation, positioning, location and/or the like, can be adapted (e.g., adjusted, configured, and/or directed from afar), automatically, manually and/or semi-automatically.

In some examples, camera 1100 may comprise a plurality of imaging modules such as, for instance, a Tele-lens assembly and a wide FOV lens assembly having corresponding optical imaging axes. In some examples, the plurality of imaging modules may be incorporated in a Smartphone device.

In some embodiments, a polarizer 1160 may be pre-installed in camera 1100. In some embodiments, camera 1100 may be retrofitted with polarizer 1160. In some embodiments, polarizer 1160 may be positioned in front of imaging optics 1120. In some other embodiments, polarizer 1160 may be positioned between image sensor 1140 and imaging optics 1120.

Imaging system 1000 may further include a processor 1200 and a memory 1300 which is configured to store data 1310 and algorithm code 1320. Processor 1200 may be configured to execute algorithm code 1320 for the processing of data 1310 resulting in the implementation of a scene acquisition control and analysis (SACA) engine 1400.

SACA engine 1400 may be configured to determine a present or expected orientation (also: camera-surface orientation) between a specular surface and camera 1100. SACA engine 1400 is further configured to determine, based on the determined camera-surface orientation, a desired polarizer orientation that reduces or eliminates incidence of unwanted specular onto the image sensor. The surface-camera orientation may for example be determined as outlined in more detail herein below.

The term "processor", as used herein, may additionally or alternatively refer to a controller. Processor 1200 may be implemented by various types of processor devices and/or processor architectures including, for example, embedded processors, communication processors, graphics processing unit (GPU)-accelerated computing, soft-core processors and/or general purpose processors.

Memory 1300 may be implemented by various types of memories, including transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 1300 may, for example, include, e.g., temporally-based and/or non-temporally based instructions. As long-term memory, memory 1300 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

Imaging system 1000 may further include an input/output device 1500 which may be configured to provide or receive any type of data or information. input/output device 1500 may include, for example, visual presentation devices or systems such as, for example, computer screen(s), head mounted display (HMD) device(s), first person view (FPV) display device(s), device interfaces (e.g., a Universal Serial Bus interface), and/or audio output device(s) such as, for example, speaker(s) and/or earphones. Input/output device 1500 may be employed to access information generated by the system and/or to provide inputs including, for instance, control commands, operating parameters, queries and/or the like. For example, input/output device 1500 may allow a user of imaging system 1000 to perform one or more of the following: approval of system-suggested object identification and/or of their attributes; camera control; providing a command input to lock onto and track a movable platform. In some embodiments, imaging system 1000 may be configured to automatically or semi-automatically perform object identification and tracking of the object as a target.

Imaging system 1000 may further comprise at least one communication module 1600 configured to enable wired and/or wireless communication between the various components and/or modules of the system and which may communicate with each other over one or more communication buses (not shown), signal lines (not shown) and/or a network infrastructure.

RF-based wireless communication; optical-based wireless communication such as infrared (IR) based signaling, and/or wired communication. Network 1800 may be configured for using one or more communication formats, protocols and/or technologies such as, for example, to internet communication, optical or RF communication, telephony-based communication technologies and/or the like. In some examples, communication module 1600 may include I/O device drivers (not shown) and network interface drivers (not shown) for enabling the transmission and/or reception of data over network 1800. A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G, 5G, 6G mobile networks, 3GPP, LTE, LTE advanced, Bluetooth® (e.g., Bluetooth smart), ZigBee™, near-field communication (NFC) and/or any other current or future communication network, standard, and/or system.

Imaging system 1000 may further include a power module 1700 for powering the various components and/or modules and/or subsystems of the system. Power module 1700 may comprise an internal power supply (e.g., a rechargeable battery) and/or an interface for allowing connection to an external power supply.

It will be appreciated that separate hardware components such as processors and/or memories may be allocated to each component and/or module of imaging system 1000. However, for simplicity and without be construed in a limiting manner, the description and claims may refer to a single module and/or component. For example, although processor 1200 may be implemented by several processors, the following description will refer to processor 1200 as the component that conducts all the necessary processing functions of imaging system 1000.

Functionalities of imaging system 1000 may be implemented fully or partially by a multifunction mobile communication device also known as "smartphone", a mobile or portable device, a non-mobile or non-portable device, a digital video camera, a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), personal digital assistant, a workstation, a wearable device, a handheld computer, a notebook computer, a vehicular device, a non-vehicular device, a stationary device and/or a home appliances control system. For example, camera 1100 may be a smartphone camera, and some of SACA engine 1400 functionalities may be implemented by the smartphone and some by devices and/or system external to the smartphone. Alternative configurations may also be conceived.

In some embodiments, SACA engine 1400 may be configured to determine a present or expected camera-surface orientation of the camera's optical axis Cz relative to transparent and specular surface 610.

For instance, SACA engine 1400 may analyze scene image data descriptive of captured scene 500 comprising platform 600 and determine, based on the performed analysis, a present or expected camera-platform orientation. The expression "camera-platform orientation" may herein be referred to as the angle θ formed between a platform (e.g., vehicle) longitudinal axis Vz relative to the camera optical axis Cz. It is noted that alternative definitions may be used for describing relative orientations between the camera and the platform.

Based on the present or expected camera-platform orientation, the corresponding present or expected relative camera-surface orientation between a vehicle's specular surface 610 and the camera optical axis Cz may be derived to determine, based on the derived camera-surface orientation, a desired polarizer orientation to reduce or prevent specular reflections from entering the camera's FOV. In some other examples, the camera-surface orientation may be determined without prior determination of the present or expected camera-vehicle orientation to determine, based on the camera-surface orientation, a desired polarizer orientation.

In some embodiments, methods that are based on artificial intelligence (AI) may be employed to determine a present or expected camera-surface orientation.

Based on the determined camera-surface orientation θ, a desired polarizer orientation γ can be determined without requiring but not necessarily excluding the measurement or calculation of light polarization.

In some embodiments, a desired polarizer orientation γ can be determined without requiring but without necessarily excluding environmental conditions (e.g., weather conditions and/or considering of sun position).

In some embodiments, considering a selected camera position, imaging direction and geographical characteristics, a range of camera-surface orientation values may be associated with a corresponding desired range of polarizer orientation values, for example, through a look-up-table and/or through a mathematical function. Hence, in some examples, polarizer orientations may be predetermined with respect to corresponding camera-surface orientations.

In the example shown with respect to FIGS. 4A-D and 5A-5D, the orientation θ of platform 600 changes relative to world reference coordinate system Wxzy while the camera's orientation relative to Wxyz remains stationary. The camera-surface orientation may be determined, for example, by considering platform characteristics. With respect to a vehicle, such characteristics may include, for example, the type of vehicle (e.g., passenger car, truck, bus); vehicle category (e.g., sportscar, SUV, family car), vehicle make (e.g., Mazda, Volkswagen, Porsche) and/or year of manufacturing. SACA engine 1400 may for example compare data relating to imaged vehicle 600 with vehicle information stored in a vehicle database of the system's memory 1300. If the comparison yields a match, the respective vehicle information may be used as a basis for determining the camera-surface orientation to determine a desired polarizer orientation γ. In FIGS. 4A-D and 5A-D, polarizer orientations γ1-γ4 are associated with camera-platform orientations θ1-θ4 resulting in that object 700 remains characterizable (e.g., identifiable, authenticable, classifiable) through transparent and specular surface 610 for any of the example camera-platform orientations θ1-θ4.

As noted above, a present or expected camera-surface orientation may be determined based on natural and/or manmade characteristics of a geographical area. In the example shown with respect to FIGS. 6A-D and 7A-D, the orientation of a vehicle in a certain geographical area can be assumed to be substantially constant relative to world reference coordinate system, considering for instance manmade physical characteristics such as roadway 510. Accordingly, vehicle 600 may be considered to have a basic orientation, as defined herein above. For example, if roadway 510 is a one-way street or a highway lane, vehicles driving on roadway 510 can be considered to travel in a predefined direction D relative to world reference coordinate system Wxyz. Based on knowledge of a camera's imaging direction relative to Wxyz and/or relative to the portion of roadway 510, the orientation of a vehicle's specular surface relative to the camera's imaging direction can be determined. For example, the camera-vehicle orientation may be considered identical to the orientation of road direction relative to camera 1100. The determined camera-road orientation may then be used to derive (e.g., estimate) a camera-surface orientation. Polarizer orientations γ1-γ4 which are associated with the camera-platform orientations θ1-θ4 are schematically illustrated in FIGS. 6A-D and 7A-D.

In some embodiments, imaging system 1000 may receive data relating to camera 1100 including, for example, camera position (e.g., time-position tuple) with respect to world reference coordinate system Wxzy, a present camera pitch and/or yaw value, camera zoom range, a present camera zoom value, dynamic range, contrast, image autocorrection parameters, and/or the like. In some examples, camera data may be provided by inertial sensors and/or non-inertial sensors. Non-inertial sensors may include, for example, one or more barometers, proximity sensors, altimeters, magnetometers, a compass, light sensors (e.g., for measuring the amount of incident sunlight), tactile sensors (e.g., touch screen sensors), receivers of a space-based satellite navigation system, and/or a front and/or back camera. Inertial sensors may include, for example, a gyroscope and/or an accelerometer. In some embodiments, camera position and orientation may be provided by a receiver of a space-based satellite navigation system (e.g., GPS, GLONASS), by apparatuses for implementing a navigation system that is not based on a satellite system, and/or an inertial senor.

In some embodiments, imaging system 1000 may receive data descriptive of information relating to geographical characteristics of a scene to be captured by camera 1100. In some examples, Information about geographical characteristics of a scene to be captured by camera 1100 may be obtained from map data (e.g., 2D or 3D map of scene 500), and/or atlases. For example, map data may be received by imaging system 1000 from one or more sensors (e.g., camera 1100) in real time or near real-time (RT) and/or from a database storing publicly available scene information comprising satellite images and/or maps, for example, from publicly available sources (e.g., satellite images and/or maps) fetched from respective map services (e.g., Google® Maps, Google® Earth, Bing® Maps, Leaflet®, MapQuest® and/or the like).

In some embodiments, information about geographical characteristics may be provided to system 1000 by the user. In some embodiments, imaging system 1000 may be configured to automatically analyze (real-time (RT) or non-RT) image data descriptive of a geographical area to identify various geographical features and characterize the geographical features. For instance, a data may be automatically characterized as road information along with a corresponding driving direction constraint.

In some embodiments, both platform as well as geographical characteristics may be considered by SACA engine 1400 for determining a desired polarizer orientation.

In some embodiments, a polarizer filter configuration may be determined based on where a specular surface is displayed on a screen.

Reference is now made to FIGS. 8A and 8B to schematically illustrate that different screen display regions may be associated with different polarizer configurations.

FIGS. 8A and 8B schematically show a platform traversing a screen from the upper left (t=t1 in FIG. 8A) in direction to the lower right (t=t2 in FIG. 8B). In the situation shown with respect to FIG. 8A where vehicle 600 is shown in an upper left display region 521, the polarizer orientation may for example be set to a desired orientation γ1, and for the situation shown in FIG. 8B where vehicle 600 is shown in a middle right display region 522 the polarizer orientation may for example be set to a desired orientation γ2.

Figure 9:
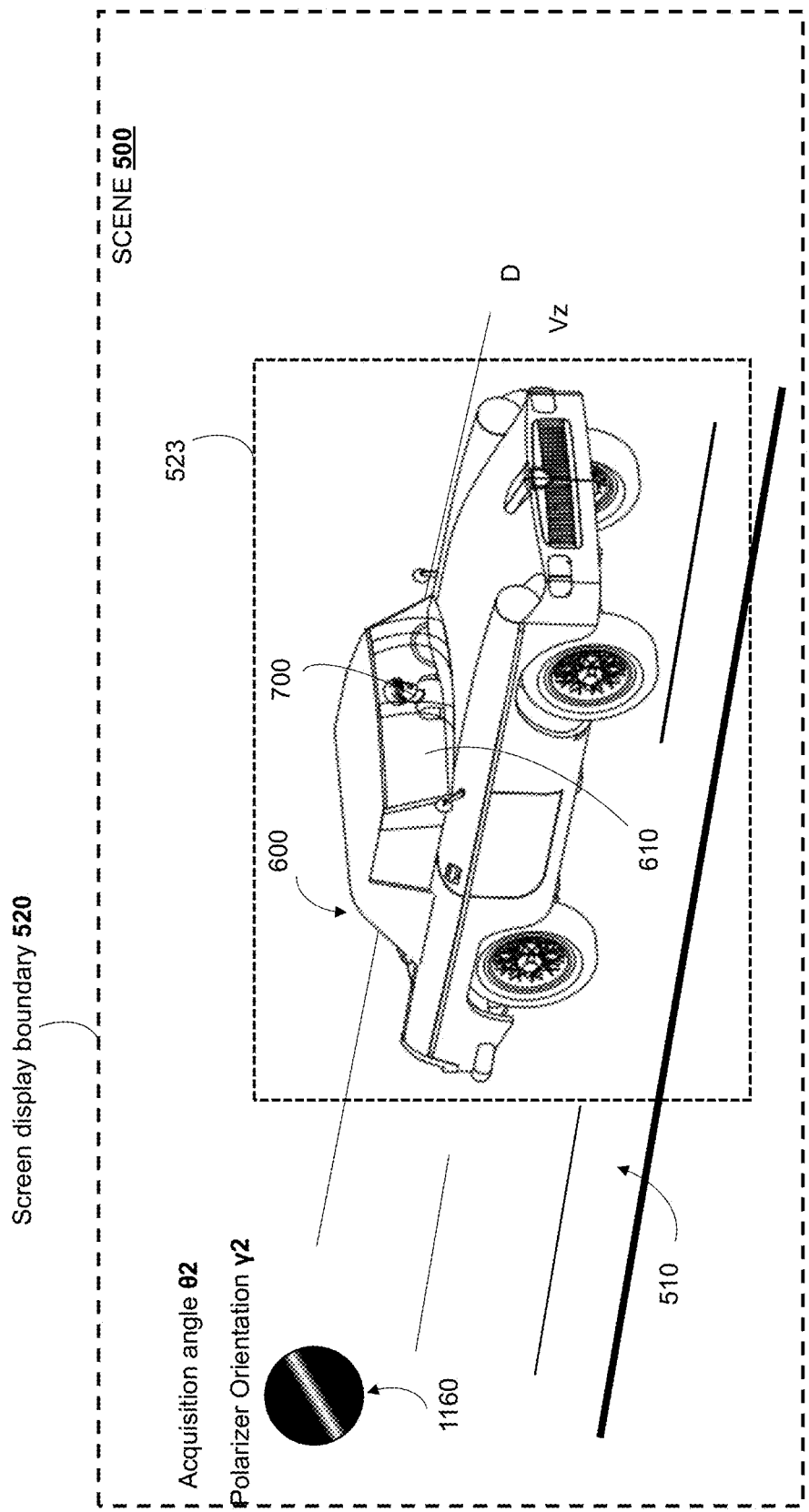
FIG. 9 schematically shows another image of a platform in a scene, the image displaying reduced or no specular reflections in a center region of the displayed image, according to some embodiments.

In some embodiments, a polarizer may be configured to provide comparatively improved or optimized specular filter configurations for a selected screen region. For example, a polarizer orientation may be optimized for a center screen region 523, as schematically illustrated in FIG. 9.

Figure 10:
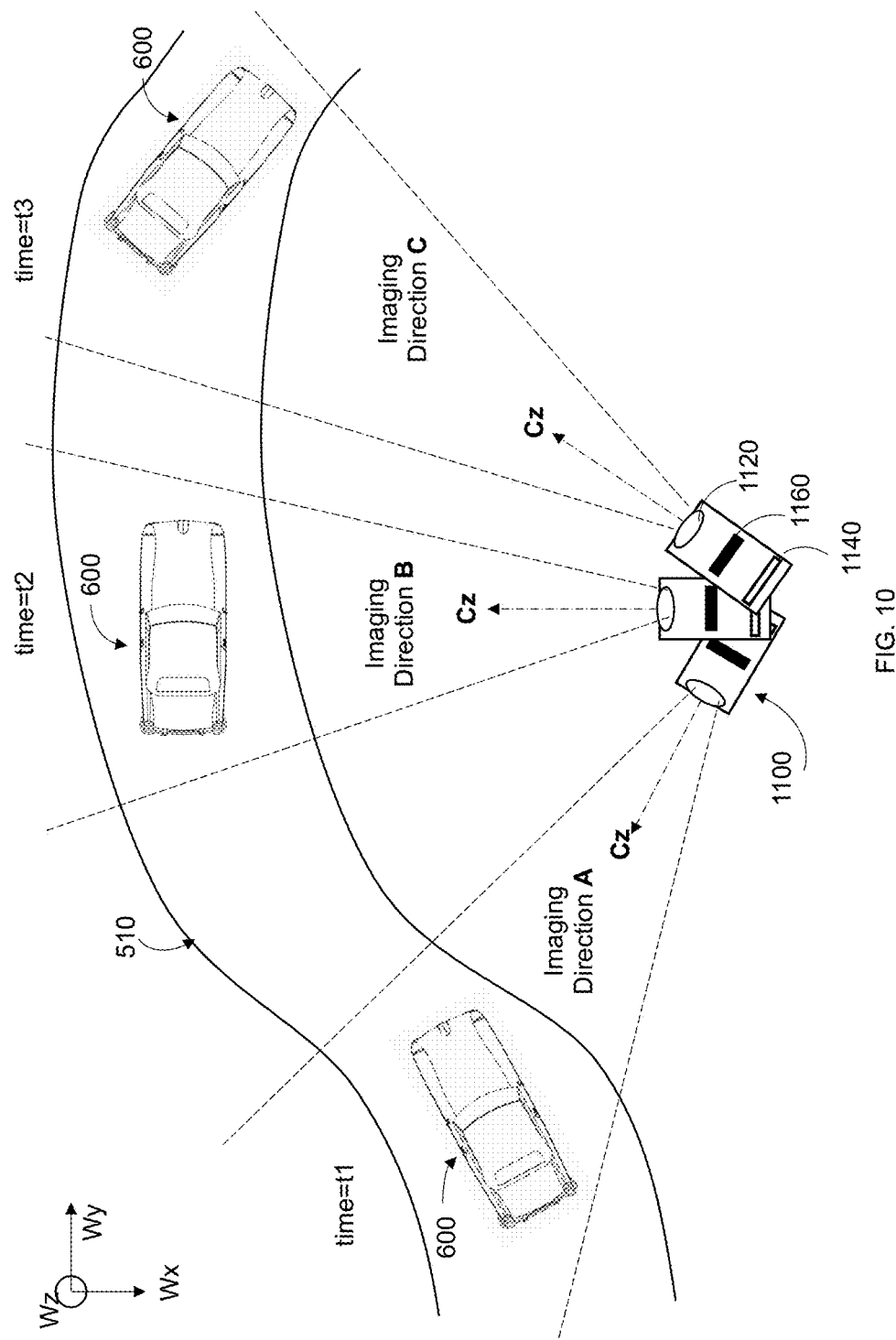
FIG. 10 schematically shows a top view of platform in a scene and a camera traversing a scene to capture images of the platform as it travels along a road.

Additional reference is made to FIG. 10. As noted above, imaging system 1000 may in some embodiments be configured to acquire and lock onto a moving platform 600 for tracking purposes. Platform tracking may be implemented by a plurality of cameras 1100 that are positioned in different imaging directions and/or by at least one camera 1100 that is coupled with an (e.g., gymbaled) steering mechanism for controllably steering camera 1100, for example, in three degrees of freedom. Tracking of vehicle 600 by camera 1100 over time is schematically illustrated by the respective different imaging directions A, B and C at corresponding time stamps t1, t2 and t3. The desired polarization filter configurations may be preset or predetermined for the various imaging directions A, B and C. Desired polarizer orientations may therefore already be associated with corresponding imaging directions prior to initiating tracking of vehicle 600. Hence, polarizer orientation adjustment to a desired orientation can be performed during vehicle tracking without any or with negligible latency.

Figure 11:
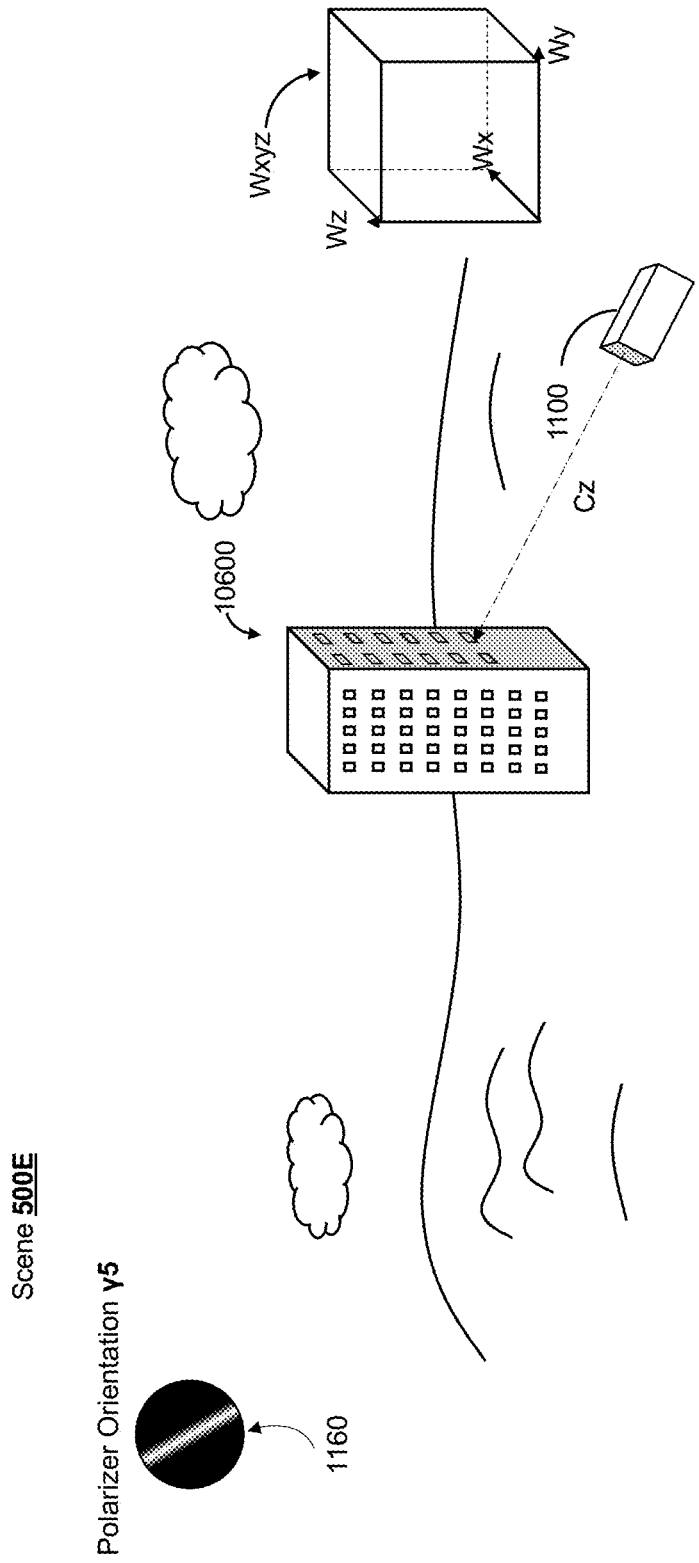
FIG. 11 schematically shows a stationary platform in a scene that is being imaged with a camera, according to some embodiments.

Referring now to FIG. 11, imaging system 1000 may be employed to allow characterization of scene ROIs (specular sROI) behind window buildings, glass doors, shop windows, and/or the like. Windows of buildings are, as noted above, examples of manmade physical characteristics of a geographical area. A desired polarizer orientation γ5 can be determined based on the position and orientation of a closed window of a building 10600 and of an imaging direction employed by camera 1100 within world reference coordinate system Wxyz.

In some embodiments, as noted above, a specular and transparent surface may pertain to a water surface. Imaging system 1000 may thus facilitate or enable the imaging of objects immersed in water from above the water surface. In some embodiments, imaging system 1000 may be operable to control an image sensor exposure time of sufficient duration and/or gain to obtain object image data allowing characterization of the specular sROI and/or of an object (e.g., a person) in the specular sROI located behind the transparent and specular surface. In some examples, the exposure time is determined, for example, based on one or more of the following: an amount of reflected specular light that is incident onto the at least one first image sensor; an amount of sunlight incident onto a light sensor.

In some embodiments, imaging system 1000 may be configured to control one or more image acquisition parameter values to generate a sequence of multiplexed image frames that includes frames generated for imaging the sROI and frames generated for imaging scene portions outside the sROI.

Image acquisition parameter values such as, for example, multiplexing parameters (e.g., frame combination sequence), number of frames assigned for readout of sROI image data and for readout of ex-sROI data, sensor gain, exposure time, sROI size, and/or ex-sROI size, may be predetermined or controlled (e.g., dynamic or adaptively) to obtain first image data allowing characterization of a specular sROI behind a specular surface and/or characterization of objects positioned in the specular sROI, and further to obtain second image data descriptive of scene portions outside the specular sROI (hereinafter: ex-sROI).

For example, the image acquisition parameter values may be controlled to obtain first image information about a person seated behind a vehicle windshield, and to obtain second image information about the vehicle's license plate.

In some embodiments, data obtained from a plurality of first frames may be processed to obtain an image for specular sROI characterization purposes, and data obtained from at least one second frame may be used to obtain a scene portion that is outside the specular sROI. More image frames may be combined to obtain specular ROI image information than to obtain information about the scene portion which is outside the specular sROI. For example, a plurality of consecutive or non-consecutive frames may be generated and readout for obtaining image data descriptive of the sROI, and plurality of consecutive or non-consecutive frames may be generated and readout for obtaining image data descriptive of scene portions outside the sROI. Optionally, different sROI image acquisition parameter value may be employed for generating different sROI frames and/or different ex-sROI image acquisition parameter values may be employed for generating different ex-sROI frames.

Figure 13A:
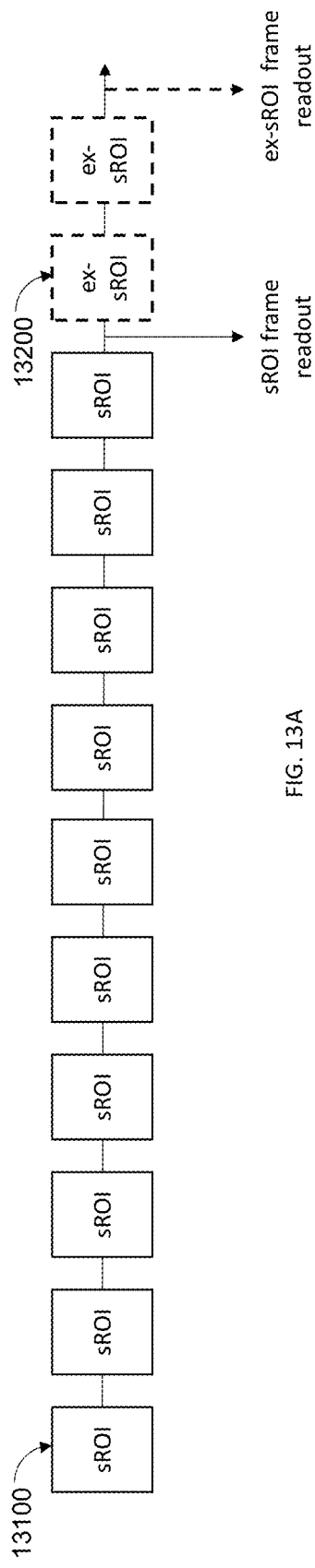
FIG. 13A shows a frame multiplexing sequence diagram, according to some embodiments.
Figure 13B:
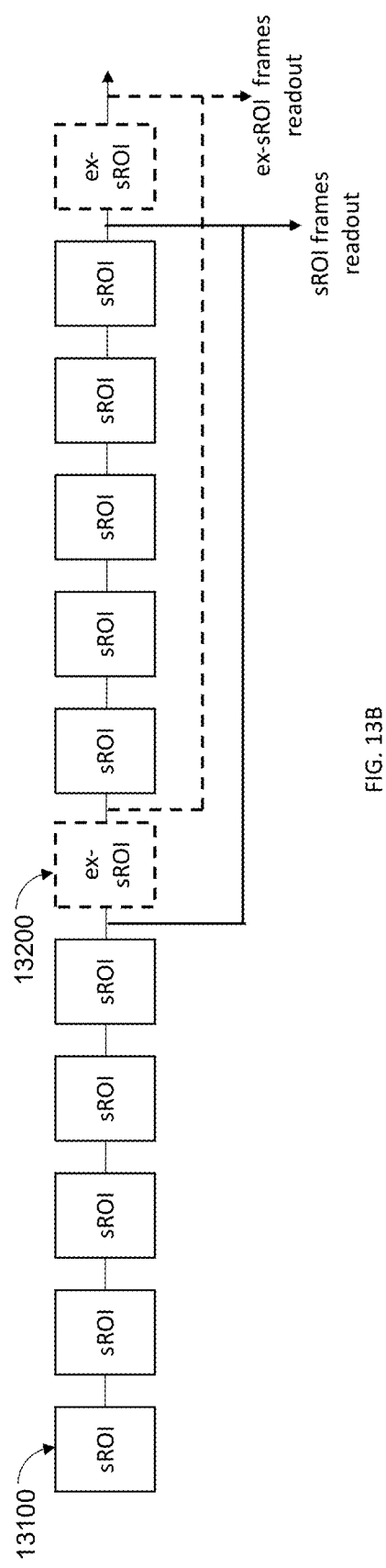
FIG. 13B shows a frame multiplexing sequence diagram, according to some other embodiments.

In the example shown in FIG. 13A, 10 consecutive frames may be generated and readout to obtain characterizable sROI image information, and 2 consecutive frames may be generated and readout to obtain characterizable ex-sROI image information. In the example shown in FIG. 13B, a set of 5 consecutive sROI frames 13100 may be generated, which is followed by the generation of an ex-sROI frame 13200. The latter is then followed the generation of another set of 5 consecutive sROI frames 13100. The other set of five sROI frames 13100 is then followed by another ex-sROI frame. The two sets of sROI frames 13100 may be readout to generate characterizable sROI image information and the two ex-sROI frames 13200 may be readout to generate characterizable ex-sROI image information.

In some embodiments, the image acquisition parameter values may be controlled, for example, based on the amount of scene light incident onto the system's imaging sensor(s). For example, the conversion of incident light reflected from the skin of light-skinned persons into electronic signals may require less gain and/or exposure time than the conversion of incident light reflected from the skin of dark-skinned persons to allow object characterization. In another example, the conversion of incident light reflected from light-colored vehicles into electronic signals may require less gain and/or exposure time than the conversion of incident light reflected from the dark-colored vehicle. Hence, as exemplified herein, the image acquisition parameter values may be adaptively controlled for the imaging of sROI and ex-sROI.

In some embodiments, the exposure time and/or gain required to obtain specular sROI image information may be higher compared to an exposure time and/or gain required to obtain ex-sROI image information. For example, the exposure time in a frame to obtain specular sROI image information may be 15 milliseconds, whereas the exposure time in a frame to obtain ex-sROI image information may be 1 millisecond. Hence, in some scenarios, when generating the specular sROI information, pixels which may be associated with ex-sROI may be overexposed to ensure sufficient photon accumulation for pixels which are largely subjected to specular reflections. On the other hand, when generating the ex-sROI information, pixels which are employed for imaging sROI information may be comparatively underexposed, for example, for the purpose of person characterization (e.g., person identification), e.g., due to the employment of the polarizer filter which may render the sROI to become comparatively dark.

In some embodiments, image acquisition parameter values of a frame to generate specular sROI information and of a frame to generate ex-sROI information may be predetermined. In some embodiments, image acquisition parameter values of frames used to generate specular sROI information may be updated dynamically or adaptively. In some embodiments, image acquisition parameter values of frames used to generate ex-sROI information may be updated dynamically or adaptively.

Accumulating data by continuously reading out image frames improves image quality, may allow the imaging of an object from different directions and/or under different lighting conditions, thereby improving object (e.g., person) identification precision, as well as person authentication precision. For example, data relating to facial features, skin texture, skin color, and/or the like, may be enriched by continuously reading out of image frames.

In some embodiments, as shown in FIG. 3, imaging system 1000 may further include a light power sensor 1900 for obtaining an estimate of the (e.g., average) amount of light that is incident onto image sensor 1140 from scene (e.g., ambient light) during a certain sensor exposure time. Such incident light estimate may be taken into consideration by imaging system 1000 when controlling image acquisition parameter values.

In cases where there are large differences in the amount of light received from various portions of scene 500, the incident light estimate may not be taken into consideration by imaging system 1000. This may for example be the case when the amount of ambient light incident onto light power sensor 1900 is significantly different from the amount of light incident the object. One example scenario includes a vehicle parked in an environment covered by the camera's FOV where only the parked vehicle and possibly its immediate surroundings are lit by artificial light, and the remainder environment is dark (e.g., in the street at night, in an underground car park, etc.).

In some embodiments, specular and diffusive sROI information may be generated through selective control of the operating parameters of different pixel subsets in same frame.

For example, the exposure time of the first sensor pixels may be set to a value such to ensure sufficient photon integration to enable sROI characterization and/or object characterization in the specular sROI. The same exposure time may be concurrently employed for the second sensor pixels although this may cause pixel overexposure.

In some embodiments, imaging system 1000 may be configured to automatically detect or determine, for a given frame, which sensor pixel is largely subjected to specular reflections and which not.

Depending on the said detection, imaging system 1000 may adaptively and selectively adjust the exposure times to enable specular sROI characterization and/or object characterization with the first sensor pixels and prevent overexposure of the second sensor pixels. This adaptive process may be performed continuously.

In some embodiments, the first and second exposure time durations of a first and second subset of pixels may be predetermined for imaging the specular sROI and the diffusive sROI, respectively.

In some embodiments, the first exposure time duration of the first subset of pixels for imaging the specular sROI may be adaptively controlled, and the second exposure time duration of the second subset of pixels for imaging the diffusive sROI may be predetermined.

In some embodiments, the first exposure time duration for specular sROI imaging may be predetermined and the second exposure time duration for imaging a diffusive sROI may be adaptively controlled.

In some embodiments, the first and the second exposure time durations of the first and second subset of pixels may be adaptively controlled.

In some scenarios, the first exposure time for imaging a specular sROI behind a specular surface may be shorter than the second exposure time required for imaging the remainder scene region. For example, when a vehicle is in dark surroundings and the space behind the specular surface is illuminated, the first exposure time for imaging the specular sROI behind the specular surface may be reduced compared to the exposure time required for imaging the remainder scene portions. In such scenario, the polarization filter functionality may be disabled when imaging the sROI behind the specular surface.

In some embodiments, the first and second sensor pixels may be of the same sensor. In some embodiments, the first and second sensor pixels may be of different sensors. In some embodiments, the first and second sensor pixels may be of different sensors but of the same camera. In some embodiments, the first and second sensor pixels may be of sensors employed by different cameras.

Image acquisition parameter values may be changed dynamically and/or adaptively. Dynamic image acquisition parameter values are forcefully changed, for example, periodically according to a certain clock value. Adaptive thresholds are changed in response to changes in characteristics of, for example, the scene and may vary depending on a variety of parameters.

Figure 12:
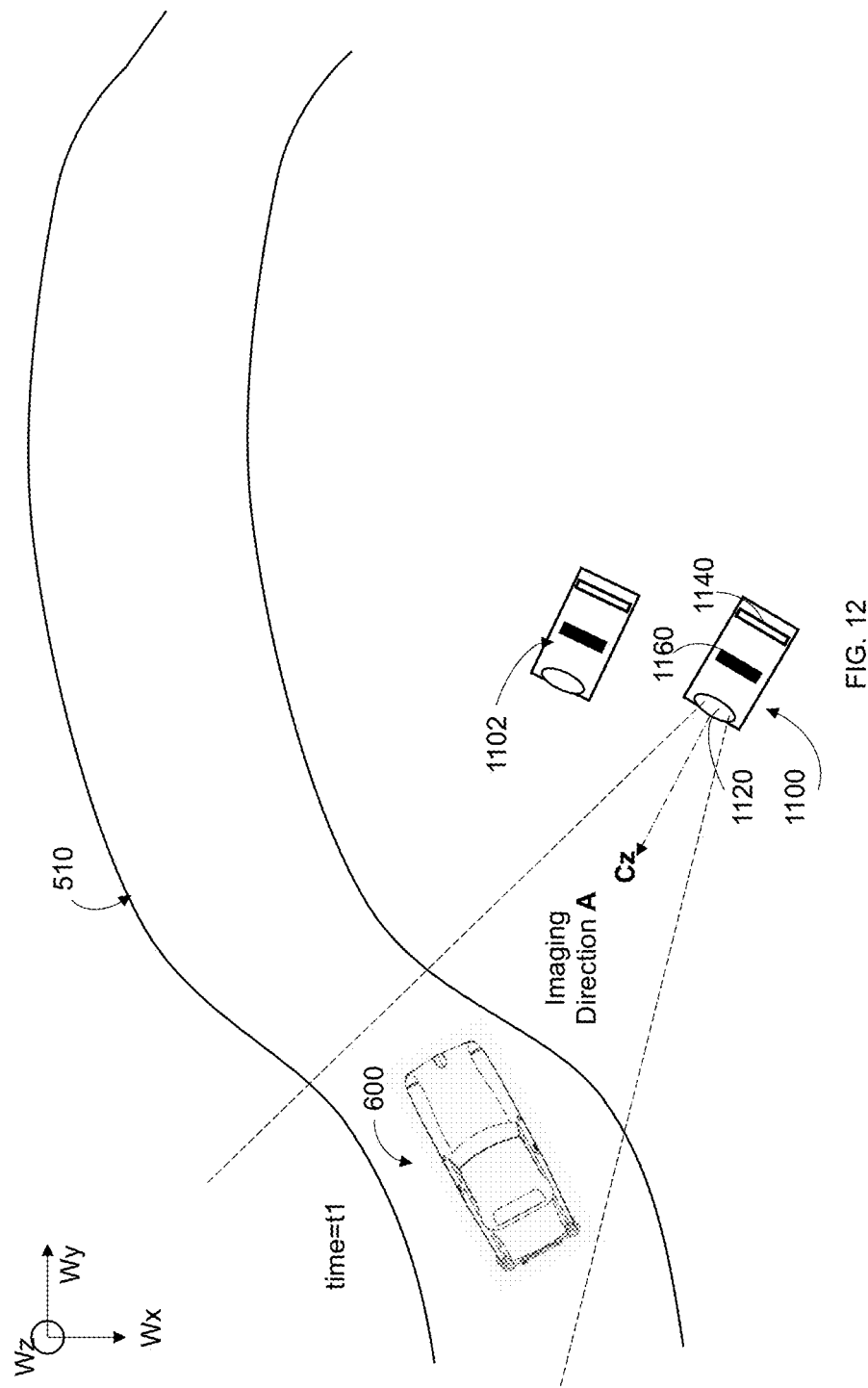
FIG. 12 schematically shows a top view of platform in a scene and a plurality of cameras configured to capture images of the platform as it travels along a road, according to some embodiments.

As schematically shown in the example scenario of FIG. 12, a first exposure time and/or gain may be employed by first camera 1100 to acquire an object located behind a transparent and specular (e.g., vehicle) surface (e.g., a windshield), while a second exposure time shorter than the first exposure time and a second gain lower than the first gain may be employed by second camera 1102 to acquire diffusive reflections pertaining to, for example, the vehicle's plate number, vehicle color, vehicle shape, etc. for vehicle characterization purposes.

Referring now to FIG. 14, a method for acquiring images of a scene comprising a specular surface may include determining an orientation of a specular surface in the scene relative to imaging optics of a camera (block 14100).

The method may further include determining, based on the orientation, a polarization filter orientation such that specular light reflections onto an image sensor of the camera are filtered out at least partially or completely (block 14200).

ADDITIONAL EXAMPLES

Example 1 pertains to an imaging system configured to facilitate or enable vision through at least partially transparent and specular surfaces, comprising: at least one image acquisition device for acquiring a scene image comprising an at least partially transparent surface providing specular light reflections; the at least one image acquisition device comprising an image sensor and imaging optics having an optical axis for guiding light received from the scene along the optical axis onto the image sensor;
at least one polarization filter operably positioned between the image sensor and the object;
a processor and a memory which are configured to perform the following:
determining an orientation of the at least partially transparent surface relative to the optical axis of the imaging optics; and
determining, based on the orientation of the surface relative to the optical axis, a polarization filter orientation such that an amount of specular light reflections incident onto the image sensor is reduced or minimized (e.g., at least partially or fully blocked).

In Example 2, the subject matter Example 1 may optionally further include automatically determining and controlling the polarization filter orientation such that the amount of reflective surface reflected light incident onto the at least one first image sensor is reduced or minimized.

In Example 3, the subject matter of any one or any combination of Examples 1-2 may optionally further include, wherein an orientation of the at least partially transparent surface relative to the at least one first imaging optics is determined based on:
one or more characteristics of a geographic area in which the image sensor and the object are located;
one or more characteristics of the platform comprising the reflective surface;
environmental conditions including ambient light conditions at the time of scene image acquisition;
a time of day at which the scene image is acquired; or
any combination of the aforesaid.

In Example 4, the subject matter of Example 3 may optionally further include, wherein the one or more platform characteristics are determined based on the one or more acquired scene images comprising the at least partially transparent surface.

In Example 5, the subject matter of any one or any combination of Examples 3-4 may optionally further include wherein the one or more platform characteristics includes a vehicle class and/or type.

In Example 6, the subject matter of any one or any combination of Examples 1-5 may optionally further include wherein the controlling of the polarization filter orientation is further based on one of the following:
a position and orientation of the at least partially transparent surface in a reference frame; and
a position and imaging direction of the at least one first image capturing device sensor in the reference frame.

In Example 7, the subject matter of any one or any combination of Examples 1-6 may optionally further include wherein the polarization filter orientation is determined without performing on-site: light polarization measurement of specular light reflections.

In Example 8, the subject matter of any one or any combination of Examples 1-7 may optionally further include wherein the polarizer filter orientation is set to a desired value for imaging a scene portion that is located behind the at least partially transparent surface such to allow characterization of the scene portion.

In Example 9, the subject matter of any one or any combination of Examples 1-8 may optionally further include wherein image acquisition parameter values used for imaging a specular region-of-interest (sROI) of a scene may differ from the imaging acquisition parameter values employed for imaging scene portions outside the sROI In Example 10, the subject matter of Example 9 may optionally further include wherein the image acquisition parameter values are determined based on one of the following:
an amount of light reflected from the at least partially transparent surface and incident onto the at least one first image sensor;

an amount of ambient light incident onto an additional image sensor, or both.

In Example 11, the subject matter of Example 9 and/or 10 may optionally further include that the system is configured to controllably allow overexposure of sensor pixels which are imaging scene portions that are outside the sROI to ensure sufficient photon accumulation from the sROI.

In Example 12, the subject matter of Example 9 and/or 10 may optionally further include that the system is configured to controllably allow underexposure for the purpose of person characterization (e.g., identification) of sensor pixels subjected to light incident from the sROI to avoid overexposure of sensor pixels used for imaging scene portions which are outside the sROI.

In Example 13, the subject matter of any one or any combination of Example 9-12 may optionally further include wherein the system is configured to control the image acquisition parameter values to generate a sequence of multiplexed image frames that includes frames generated for imaging the sROI and frames generated for imaging scene portions outside the sROI.

In Example 14, the subject matter of any one or any combination of Example 9-13 may optionally further include wherein the image acquisition parameters values refer to one of the following: gain, exposure time, multiplexing parameters, sROI size, ex-sROI size, or any combination of the aforesaid.

In Example 15, an imaging method for enabling vision through at least partially transparent and specular surfaces, comprises:
acquiring, at least one image acquisition device having an optical axis, a scene image comprising an at least partially transparent surface providing specular light reflections;
determining an orientation of the at least partially transparent surface relative to the optical axis of the imaging optics; and
determining, based on the orientation of the surface relative to the optical axis, a polarization filter orientation such that an amount of specular light reflections incident onto the image sensor is reduced or minimized (e.g., prevented or avoided). In Example 16, the subject matter of Example 15 may optionally further comprise automatically determining and controlling the polarization filter orientation such that the amount of reflective surface reflected light incident onto the at least one first image sensor is reduced or minimized.

In Example 17, the subject matter of Examples 15 and/or 16 may optionally further comprise wherein an orientation of the at least partially transparent surface relative to the at least one first imaging optics is determined based on:
one or more characteristics of a geographic area in which the image sensor and the object are located;
an orientation of the platform or of the at least partially transparent surface in the scene;
environmental conditions including ambient light conditions at the time of scene image acquisition;
a time of day at which the scene image is acquired; or
any combination of the aforesaid.

In Example 18, the subject matter of any one or any combination of examples 15 to 17 may optionally further comprise wherein the platform characteristic is determined based on the one or more acquired scene images comprising the at least partially transparent surface.

In Example 19, the subject matter of Example 18 may optionally further comprise wherein the platform characteristic includes a vehicle class and/or type.

In Example 20, the subject matter of any one or any combination of examples 15 to 19 may optionally further comprise wherein the controlling of the polarization filter orientation is further based on one of the following:
a position and orientation of the at least partially transparent surface in a reference frame; and
a position and imaging direction of the at least one first image capturing device sensor in the reference frame.

In Example 21, the subject matter of any one or any combination of examples 15 to 20 may optionally further comprise wherein the polarization filter orientation is determined without performing on-site: light polarization measurement of specular light reflections.

In Example 22, the subject matter of any one or any combination of examples 15 to 21 may optionally further comprise setting the polarizer filter orientation to a desired value for imaging a scene portion that is located behind the at least partially transparent surface such to allow characterization of the scene portion.

In Example 23, the subject matter of any one or any combination of examples 15 to 22 may optionally further comprise wherein image acquisition parameter values used for imaging a specular region-of-interest (sROI) of a scene may differ from the imaging acquisition parameter values employed for imaging scene portions outside the sROI.

In Example 24, the subject matter of example 23 may optionally further comprise wherein the image acquisition parameter values are determined based on one of the following: an amount of light reflected from the at least partially transparent surface and incident onto the at least one first image sensor; an amount of ambient light incident onto an additional image sensor, or both.

In Example 25, the subject matter of Examples 23 and/or 24 may optionally further comprise controllably allowing overexposure of sensor pixels which are imaging scene portions that are outside the sROI to ensure sufficient photon accumulation from the sROI.

In Example 26, the subject matter of Examples 23 and/or 24 may optionally further comprise controllably allowing underexposure for the purpose of person identification of sensor pixels subjected to light incident from the sROI to avoid overexposure of sensor pixels used for imaging scene portions which are outside the sROI.

In Example 27, the subject matter of any one or any combination of Examples 23 to 26 may optionally further comprise controlling the image acquisition parameter values to generate a sequence of multiplexed image frames that includes frames generated for imaging the sROI and frames generated for imaging scene portions outside the sROI.

In Example 28, the subject matter of any one or any combination of Examples 23 to 27 may optionally further comprise wherein the image acquisition parameters include one of the following: gain, exposure time, multiplexing parameters, sROI size, ex-sROI size, or any combination of the aforesaid.

Example 29 pertains to an imaging system configured to reduce or prevent the effect of unwanted specular reflections reflected by specular surfaces located in a scene, comprising:

at least one image acquisition device for acquiring a scene image comprising a specular surface providing specular light reflections;

the at least one image acquisition device comprising an image sensor and imaging optics having an optical axis for guiding light received from the scene along the optical axis onto the image sensor;

at least one polarization filter operably positioned between the image sensor and the object;

a processor and a memory which are configured to perform the following:

determining an orientation of the specular surface relative to the optical axis of the imaging optics; and determining, based on the orientation of the surface relative to the optical axis, a polarization filter orientation such that an amount of specular light reflections incident onto the image sensor is reduced or minimized.

In Example 30, the subject matter of example 1 may optionally further comprise automatically determining and controlling the polarization filter orientation such that the amount of specular light reflections incident onto the at least one first image sensor is reduced or minimized.

In Example 31, the subject matter of examples 29 and/or 30 may optionally further comprise, wherein an orientation of the specular surface relative to the at least one first imaging optics is determined based on:

one or more characteristics of a geographic area in which the image sensor and the object are located; one or more characteristics of the platform comprising the specular surface;

environmental conditions including ambient light conditions at the time of scene image acquisition;

a time of day at which the scene image is acquired; or any combination of the aforesaid.

In Example 32, the subject matter of example 31 may optionally further comprise, wherein the one or more platform characteristics are determined based on the one or more acquired scene images comprising the specular surface.

In Example 33, the subject matter of any one or more of the Examples 29 to 32 may optionally further comprise wherein the one or more platform characteristics includes a vehicle class and/or type.

In example 34, the subject matter of nay one or more of the Examples 29 to 33 may optionally further comprise, wherein the controlling of the polarization filter orientation is further based on one of the following:

a position and orientation of the specular surface in a reference frame; and a position and imaging direction of the at least one first image capturing device sensor in the reference frame.

In Example 35, the subject matter of any one or more of the Examples 29 to 34 may optionally further comprise, wherein the polarization filter orientation is determined without performing on-site: light polarization measurement of specular light reflections.

In example 36, the subject matter of any one or more of the Examples 29 to 35 may optionally further comprise, wherein the specular surface is also transparent, and the polarizer filter orientation is set to a desired value for imaging a scene portion that is located behind the transparent and specular surface such to allow characterization of the scene portion.

In Example 37, the subject matter of example 36 may optionally further comprise, wherein the transparent and specular surface defines a specular region-of-interest (sROI), and wherein at least one image acquisition parameter value used for imaging of the sROI differ from the imaging acquisition parameter values employed for imaging scene portions outside the sROI.

In Example 38, the subject matter of Example 37 may optionally further comprise, wherein the at least one image acquisition parameter value is determined based on one of the following:

an amount of light reflected from the transparent and specular surface and incident onto the at least one first image sensor;

an amount of ambient light incident onto an additional image sensor, or both.

In example 39, the subject matter of examples 37 and/or 38 may optionally further comprise, wherein the system is configured to controllably allow overexposure of sensor pixels which are imaging scene portions that are outside the sROI to ensure sufficient photon accumulation from the sROI.

In example 39, the subject matter of examples 37 and/or 38 may optionally further comprise, wherein the system is configured to controllably allow underexposure for the purpose of person identification of sensor pixels subjected to light incident from the sROI to avoid overexposure of sensor pixels used for imaging scene portions which are outside the sROI.

In example 40, the subject matter of any one or more of the examples 37 to 39 may optionally further comprise, wherein the system is configured to control the image acquisition parameter values to generate a sequence of multiplexed image frames that includes frames generated for imaging the sROI and frames generated for imaging scene portions outside the sROI.

In example 41, the subject matter of any one or more of the examples 37 to 39 to 13 may optionally further comprise, wherein the image acquisition parameters values refer to one of the following: gain, exposure time, multiplexing parameters, sROI size, ex-sROI size, or any combination of the aforesaid.

Example 42 pertains to an imaging method for reducing or preventing the effect of unwanted specular reflections reflected by specular surfaces located in a scene, comprising:

acquiring, at least one image acquisition device having an optical axis, a scene image comprising a specular surface providing specular light reflections;

determining an orientation of the specular surface relative to the optical axis of the imaging optics; and determining, based on the orientation of the specular surface relative to the optical axis, a polarization filter orientation such that an amount of specular light reflections incident onto the image sensor is reduced or minimized.

In Example 43 the subject matter of Example 42 may optionally further comprise: automatically determining and controlling the polarization filter orientation such that the amount of specular light reflections incident onto the at least one first image sensor is reduced or minimized.

In example 44 the subject matter of Example 42 and/or 43 may optionally further comprise wherein an orientation of the specular surface relative to the at least one first imaging optics is determined based on:

one or more characteristics of a geographic area in which the image sensor and the object are located;

an orientation of the platform or of the specular surface in the scene;

environmental conditions including ambient light conditions at the time of scene image acquisition;

a time of day at which the scene image is acquired; or any combination of the aforesaid.

In example 45, the subject matter of any one or more of the Examples 42 to 44 may optionally further comprise, wherein the platform characteristic is determined based on the one or more acquired scene images comprising the specular surface.

In example 46, the subject matter of example 44 may optionally further comprise wherein the platform characteristic includes a vehicle class and/or type.

In example 47, the subject matter of any one or more of the examples 42 to 46 may optionally further comprise wherein the controlling of the polarization filter orientation is further based on one of the following:

a position and orientation of the specular surface in a reference frame; and a position and imaging direction of the at least one first image capturing device sensor in the reference frame.

In Example 48, the subject matter of any one or more of the examples 42 to 47 may optionally further comprise, wherein the polarization filter orientation is determined without performing on-site:

light polarization measurement of specular light reflections.

In Example 49, the subject matter of any one or more of the examples 42 to 48 may optionally further comprise, wherein when the specular surface is also transparent, further comprising setting the polarizer filter orientation to a desired value for imaging a scene portion that is located behind the transparent and specular surface such to allow characterization of the scene portion.

In Example 50, the subject matter of example 49 may optionally further comprise, wherein the transparent and specular surface defines a specular region-of-interest (sROI); and wherein at least one image acquisition parameter value used for imaging the sROI of a scene differ from the imaging acquisition parameter values employed for imaging scene portions outside the sROI.

In Example 51, the subject matter of example 50 may optionally further comprise wherein the at least one image acquisition parameter value is determined based on one of the following:

an amount of light reflected from the transparent and specular surface and incident onto the at least one first image sensor;

an amount of ambient light incident onto an additional image sensor, or both.

In Example 52, the subject matter of any one or more of the examples 50-51 may optionally further comprise controllably allowing overexposure of sensor pixels which are imaging scene portions that are outside the sROI to ensure sufficient photon accumulation from the sROI.

In Example 53, the subject matter of any one or more of the examples 50-51 may optionally further comprise controllably allowing underexposure for the purpose of person identification of sensor pixels subjected to light incident from the sROI to avoid overexposure of sensor pixels used for imaging scene portions which are outside the sROI.

In Example 53, the subject matter of any one or more of the examples 50-52 may optionally further comprise controlling the at least one image acquisition parameter value to generate a sequence of multiplexed image frames that includes frames generated for imaging the sROI and frames generated for imaging scene portions outside the sROI.

In Example 54, the subject matter of any one or more of the examples 50-53 may optionally further comprise wherein the at least one image acquisition parameter value includes one of the following: gain, exposure time, multiplexing parameters, sROI size, ex-sROI size, or any combination of the aforesaid.

It is important to note that the methods described herein and illustrated in the accompanying diagrams shall not be construed in a limiting manner. For example, methods described herein may include additional or even fewer processes or operations in comparison to what is described herein and/or illustrated in the diagrams. In addition, method steps are not necessarily limited to the chronological order as illustrated and described herein.

Any digital computer system, unit, device, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

The methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The expression "real-time" as used herein generally refers to the updating of information based on received data, at essentially the same rate as the data is received, for instance, without user-noticeable judder, latency or lag.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the data portion or data portions of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A,B,C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A,B,C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

"Real-time" as used herein generally refers to the updating of information at essentially the same rate as the data is received. More specifically, in the context of the present invention "real-time" is intended to mean that the image data is acquired, processed, and transmitted from a sensor at a high enough data rate and at a low enough time delay that when the data is displayed, data portions presented and/or displayed in the visualization move smoothly without user-noticeable judder, latency or lag.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. An imaging system configured to reduce or prevent the effect of unwanted specular reflections reflected by specular surfaces located in a scene, comprising:
    at least one image acquisition device for acquiring a scene image comprising a specular surface providing specular light reflections;
    the at least one image acquisition device comprising at least one first image sensor and imaging optics having an optical axis for guiding light received from the scene along the optical axis onto the at least one first image sensor;
    at least one polarization filter operably positioned between the at least one first image sensor and an object;
    a processor and a memory which are configured to perform the following:
    determining an orientation of the specular surface relative to the optical axis of the imaging optics; and
    determining, based on the orientation of the surface relative to the optical axis of the imaging optics, a polarization filter orientation such that an amount of specular light reflections incident onto the at least one first image sensor is reduced or eliminated,
    wherein the specular surface is also transparent, and the polarizer filter orientation is set to a desired value for imaging a scene portion that is located behind the transparent and specular surface such to allow characterization of the scene portion.

2. The imaging system of claim 1, further comprising:
    automatically determining and controlling the polarization filter orientation such that the amount of specular light reflections incident onto the at least one first image sensor is reduced or eliminated.

3. The imaging system of claim 1, wherein an orientation of the specular surface relative to the at least one first imaging optics is determined based on:
    one or more characteristics of a geographic area in which the image sensor and the object are located;
    one or more characteristics of a platform comprising the specular surface;
    environmental conditions including ambient light conditions at the time of scene image acquisition;
    a time of day at which the scene image is acquired; or
    any combination of the aforesaid.

4. The imaging system of claim 3, wherein the one or more platform characteristics are determined based on the one or more acquired scene images comprising the specular surface.

5. The imaging system of claim 4, wherein the one or more platform characteristics includes a vehicle class and/or type.

6. The imaging system of claim 1, wherein the controlling of a polarization filter orientation is further based on one of the following:
    a position and orientation of the specular surface in a reference frame; and
    a position and imaging direction of the at least one first image capturing device sensor in the reference frame.

7. The imaging system of claim 1, wherein the polarization filter orientation is determined without performing on-site:
    light polarization measurement of specular light reflections.

8. The imaging system of claim 1, wherein the transparent and specular surface defines a specular region-of-interest (sROI), and
    wherein at least one image acquisition parameter value used for imaging of the sROI differ from the at least one imaging acquisition parameter value employed for imaging scene portions outside the sROI.

9. The imaging system of claim 8, wherein the at least one image acquisition parameter value is determined based on one of the following:
    an amount of light reflected from the transparent and specular surface and incident onto the at least one first image sensor;
    an amount of ambient light incident onto an additional image sensor, or both.

10. The imaging system of claim 8, further configured to control the at least one image acquisition parameter value to generate a sequence of multiplexed image frames that includes frames generated for imaging the sROI and frames generated for imaging scene portions outside the sROI.

11. An imaging method for reducing or preventing the effect of unwanted specular reflections reflected by specular surfaces located in a scene, comprising:

acquiring, at least one image acquisition device having an optical axis, a scene image comprising a specular surface providing specular light reflections;

determining an orientation of the specular surface relative to the optical axis of the imaging optics; and determining, based on the orientation of the specular surface relative to the optical axis of the imaging optics, a polarization filter orientation such that an amount of specular light reflections incident onto an at least one first image sensor is reduced or eliminated, wherein the specular surface is also transparent, and the polarizer filter orientation is set to a desired value for imaging a scene portion that is located behind the transparent and specular surface such to allow characterization of the scene portion.

12. The method of claim 11, further comprising:

automatically determining and controlling the polarization filter orientation such that the amount of specular light reflections incident onto the at least one first image sensor is reduced or eliminated.

13. The method of claim 11, wherein an orientation of the specular surface relative to the at least one first imaging optics is determined based on:

one or more characteristics of a geographic area in which the image sensor and the object are located;

an orientation of the platform or of the specular surface in the scene;

environmental conditions including ambient light conditions at the time of scene image acquisition;

a time of day at which a scene image is acquired; or any combination of the aforesaid.

14. The method of claim 11, wherein the platform characteristic is determined based on the one or more acquired scene images comprising the specular surface.

15. The method of claim 11, wherein the controlling of the polarization filter orientation is further based on one of the following:

a position and orientation of the specular surface in a reference frame; and a position and imaging direction of the at least one first image capturing device sensor in the reference frame.

16. The method of claim 11, wherein the polarization filter orientation is determined without performing on-site:

light polarization measurement of specular light reflections.

17. The method of claim 11, wherein the transparent and specular surface defines a specular region-of-interest (sROI); and wherein at least one image acquisition parameter value used for imaging the sROI of a scene differ from the at least one imaging acquisition parameter values employed for imaging scene portions outside the sROI.

18. The method of claim 17, further comprising controllably allowing overexposure of sensor pixels which are imaging scene portions that are outside the sROI to ensure sufficient photon accumulation from the sROI.

19. The method of claim 17, further comprising controllably allowing underexposure for the purpose of person identification of sensor pixels subjected to light incident from the sROI to avoid overexposure of sensor pixels used for imaging scene portions which are outside the sROI.

* * * * *